United States Patent [19]

Sakurai et al.

[11] Patent Number: 4,471,066
[45] Date of Patent: Sep. 11, 1984

[54] POLYMERIZATION OF OLEFINS

[75] Inventors: Hisaya Sakurai; Yoshihiko Katayama; Tadashi Ikegami; Masayasu Furusato, all of Kurashiki, Japan

[73] Assignee: Asahi Kasei Kogyo Kabushiki Kaisha, Osaka, Japan

[21] Appl. No.: 463,361

[22] Filed: Feb. 3, 1983

Related U.S. Application Data

[63] Continuation-in-part of Ser. No. 347,663, Feb. 10, 1982, abandoned.

[30] Foreign Application Priority Data

Feb. 16, 1981 [JP] Japan .................................. 56-20074
Mar. 20, 1981 [JP] Japan .................................. 56-39655
Sep. 29, 1982 [JP] Japan .................................. 57-168500

[51] Int. Cl.$^3$ .................................................. C08F 4/64
[52] U.S. Cl. .................................. 502/113; 502/115; 502/116; 502/119; 502/121; 502/122; 502/123; 502/124; 502/125; 502/126; 502/127; 502/129; 502/131; 526/114; 526/116; 526/127; 526/133; 526/137; 526/139; 526/140; 526/141; 526/142
[58] Field of Search ............. 502/113, 115, 119, 116, 502/129, 131, 125, 126, 127, 123, 124, 122, 121

[56] References Cited

U.S. PATENT DOCUMENTS

| | | | |
|---|---|---|---|
| 3,094,568 | 6/1963 | Hay et al. | 502/117 X |
| 4,120,820 | 10/1978 | Birelbach | 502/115 |
| 4,159,965 | 7/1979 | Sakurai et al. | 502/116 |
| 4,224,186 | 9/1980 | Lowery et al. | 502/115 |
| 4,330,646 | 5/1982 | Sakurai et al. | 502/113 |
| 4,330,647 | 5/1982 | Sakurai et al. | 502/154 |
| 4,335,229 | 6/1982 | Sakurai et al. | 502/129 X |

Primary Examiner—Patrick Garvin
Attorney, Agent, or Firm—Sprung, Horn, Kramer & Woods

[57] ABSTRACT

A catalyst useful for polymerizing olefins which comprises a solid catalyst component [A] and an organometallic component [B], the solid catalyst component [A] being obtained by reacting (1) an organometallic compound with (2) a transition metal compound selected from the group consisting of a titanium compound, a vanadium compound, a mixture of a titanium compound and a vanadium compound and a mixture of a titanium compound and a zirconium compound, in the presence of (3) a solid reaction product of (a) an organomagnesium compound of the formula $$M_\alpha MgR_p X_q D_r$$

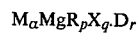

wherein
α, p, q and r each independently is 0 or a number greater than 0,
$p+q=m\alpha+2$
$0 \leq q/(\alpha+1) < 2$
m is the valence of M,
M is a metal of the 1st to 3rd groups of the Periodic Table,
R is at least one hydrocarbon group having 1 to 20 carbon atoms,
X is at least one member selected from the group consisting of a hydrogen atom and electronegative groups containing an oxygen atom, a nitrogen atom or a sulfur atom,
D is an electron donative organic compound, with (b) at least one compound selected from the group consisting of halides of boron, silicon, germanium, tin, phosphorus, antimony, bismuth or zinc and hydrogen chloride; and a polymerization process employing such a catalyst.

51 Claims, No Drawings

POLYMERIZATION OF OLEFINS

CROSS-REFERENCES TO RELATED APPLICATIONS

This application is a continuation-in-part of application Ser. No. 347,663, filed Feb. 10, 1982, now abandoned.

BACKGROUND OF THE INVENTION

This invention relates to catalysts for the polymerization of olefins, particularly for the polymerization of ethylene or the copolymerization of ethylene with other olefins. It also relates to polymerization processes employing such catalysts.

Polyolefins such as polyethylene can be produced by polymerizing olefins using catalysts comprising a transition metal compound and an organometallic compound, i.e., so-called Ziegler type catalysts. On an industrial scale, polyolefins are produced by the suspension polymerization, the solution polymerization, the gas phase polymerization or the bulk polymerization at high temperatures and high pressures using Ziegler type catalysts. The conventional Ziegler type catalyst, e.g., a catalyst comprising titanium trichloride and diethylaluminum chloride is low in the catalyst activity and accordingly, the catalyst residue remaining in the polymer formed is large in amount and causes discoloration of the polymer formed or deterioration of the polymer formed by heat or oxidation. Thus it is required to purify the polymer by a complicated step of removing catalyst residue. The trend of the times is to develop a process of compact type saving energy which employs a highly active catalyst capable of eliminating the step of removing catalyst residue from the polymer formed. As highly active catalysts, there are disclosed, for example, catalysts comprising a titanium compound supported on a magnesium compound and an organometallic compound (see Japanese Patent Publication Nos. 13050/1968, 1060/1972, 33568/1971 and 34092/1971); catalysts comprising a solid obtained by reducing a transition metal compound with an organomagnesium complex and an organometallic compound (see U.S. Pat. Nos. 4,004,071, 3,989,878 and 4,027,089); and catalysts comprising a solid obtained by reacting a reaction product of an organomagnesium complex and a halogenating agent with an organometallic compound (see U.S. Pat. No. 4,159,965 and Japanese Patent Application (OPI) Nos. 146290/1978, 26905/1981, 28206/1981, 32504/1981 and 47408/1982). Although these catalysts are highly active and compact processes using these catalysts may be achieved, there are still problems to be improved. Also, it is possible to produce polyethylenes having a low density by copolymerizing ethylene with other olefins with Ziegler type catalysts, but in order to efficiently use olefins, catalysts having a better copolymerizability are desired. Still there remain problems peculiar to each of the polymerization methods. For example, with increased polymerization temperatures in the solution polymerization and the bulk polymerization, removal of the polymerization heat evolved becomes easy and due to the decrease in the solution viscosity or the polymer viscosity it is possible to increase the solution concentration or the polymer concentration, resulting in an increase in the amount of a product. However, when the polymerization temperature is raised, the catalyst activity is decreased and as a result, it becomes difficult to produce polymers having a low melt index. On the other hand, in the suspension polymerization and the gas phase polymerization, development of catalysts capable of giving polymers having a good particle size distribution and a high bulk density is desired because shipping of polyolefins in the form of powder is possible and accordingly, a step of pelletizing the polymers obtained can be eliminated if the polymers having a good particle size distribution and a high bulk density since the polyolefins are generally shipped in the form of pellets. Furthermore, the improvement on the particle size distribution and the bulk density of polymers is an important factor for a continuous and stable operation of the suspension polymerization and the gas phase polymerization for a long period of time. Thus, there are demanded catalysts having high performances in all the aspects such as a good controllability of molecular weight distribution, a good copolymerizability, a high catalyst activity at high temperatures of polymerization, a good controllability of melt index and an excellent particle size distribution of polymers in the suspension polymerization and the gas phase polymerization as well as a high catalyst activity.

SUMMARY OF THE INVENTION

An object of this invention is to provide catalysts for the polymerization of olefins capable of producing polymers having a varied range of molecular weight distribution, i.e., from a narrow molecular weight distribution to a broad molecular weight distribution at a high catalyst activity, capable of producing polymers having a good particle size distribution and a high bulk density in the suspension polymerization and in the gas phase polymerization and showing a high catalyst activity at high temperatures in the solution polymerization and in the bulk polymerization at high temperatures and high pressures.

Another object of the present invention is to provide processes for the polymerization of olefins employing such catalysts.

Additional objects and advantages of the invention will be set forth in the description that follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the catalyst of the present invention comprises a solid catalyst component[A] and an organometallic component[B], the solid catalyst component[A] being obtained by reacting (1) an organometallic compound with (2) a transition metal compound selected from the group consisting of a titanium compound, a vanadium compound, a mixture of a titanium compound and a vanadium compound and a mixture of a titanium compound and a zirconium compound, in the presence of (3) a solid reaction product of (a) an organomagnesium compound of the formula $$M_\alpha MgR_p X_q \cdot D_r$$

wherein
$\alpha$, p, q and r each independently is 0 or a number greater than 0,
$p+q=m\alpha+2$
$0 \leq q/(\alpha+1) < 2$ m is the valence of M, M is a metal of the 1st to 3rd groups of the Periodic Table, R is at least one hydrocarbon group having 1 to 20 carbon atoms, X is at least one member selected from the group consisting of a hydrogen atom and electronegative groups containing an oxygen atom, a nitrogen atom or a sulfur atom, D is an electron donative organic compound, with (b) at least one compound selected from the group consisting of halides of boron, silicon, germanium, tin, phosphorus, antimony, bismuth or zinc and hydrogen chloride.

Further to achieve the foregoing objects and in accordance with the purpose of the invention, as embodied and broadly described herein, the process of the present invention for producing polyolefins comprises polymerizing olefins by employing the catalyst as described above.

One of the characteristic features of this invention is that the catalyst of this invention has a high catalyst activity in any of the suspension polymerization, the solution polymerization and the gas phase polymerization, and accordingly the step of removing catalyst residue can be eliminated. Furthermore, the catalyst can maintain the high catalyst activity at a temperature of from 200° C. to 350° C.

Another characteristic feature of this invention is that the catalyst of this invention can produce polymers having a wide range of molecular weight distribution, i.e., from polymers having a narrow molecular weight distribution suitable for injection molding and rotational molding to polymers having a broad molecular weight distribution suitable for extrusion molding.

Still another characteristic feature of this invention is that the catalyst of this invention can easily produce copolymers of at least two olefins having a low density in a high yield.

A further characteristic feature of this invention is that the catalyst of this invention can produce polymers having a high molecular weight, i.e., a low melt index in the solution polymerization, especially at high polymerization temperatures.

A still further characteristic feature of this invention is that the catalyst of this invention can produce polymers having an excellent particle distribution and a high bulk density. Accordingly, it is possible to increase the concentration of polymers in a polymerization reactor, resulting in an improvement on the productivity of polymers, and further shipping of polymers in the form of powder can be made easy.

DETAILED DESCRIPTION OF THE INVENTION

Each of the component materials and the reaction conditions which can be employed for the preparation of the catalyst of this invention will now be described hereinafter in detail.

The organomagnesium compounds (a) which can be employed in the preparation of a solid reaction product (3) are represented by the formula $$M_\alpha MgR_p X_q \cdot D_r$$

wherein M, R, X, D, $\alpha$, p, q and r are the same as defined above, and include dihydrocarbyl magnesium compounds $R_2Mg$ and complexes of the dihydrocarbyl compounds with other organometallic compounds.

In this formula, R is at least one hydrocarbon group having 1 to 20 carbon atoms. Exemplary hydrocarbon groups include alkyl groups such as methyl, ethyl, propyl, butyl, amyl, hexyl, heptyl, octyl, nonyl, decyl, tetradecyl and octadecyl groups; cycloalkyl groups such as cyclohexyl group; aryl groups such as phenyl group; and aralkyl groups such as benzyl group. Of these groups, alkyl groups are preferred. M is a metal of the 1st to 3rd groups of the Periodic Table. Exemplary metals represented by M include lithium, sodium, potassium, beryllium, calcium, strontium, barium, zinc, boron and aluminum. Of these metals, lithium, beryllium, boron, aluminum and zinc are preferred due to their ease in making hydrocarbon-soluble organomagnesium complexes. A more preferred metal is aluminum. The atomic ratio of M to Mg, i.e., $\alpha$ is zero or a number greater than zero and it is preferred to employ $\alpha$ of $0 \leq \alpha \leq 1$. A more preferred $\alpha$ is $0.01 \leq \alpha \leq 0.5$. X is a hydrogen atom, an electronegative group containing an oxygen atom, a nitrogen atom or a sulfur atom or any mixture thereof. Exemplary electronegative groups include $OR^1$, $OSiR^2R^3R^4$, $NR^5R^6$, $SR^7$

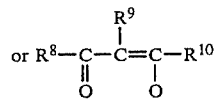

wherein $R^1$, $R^7$, $R^8$ and $R^{10}$ each independently is a hydrocarbon group having 1 to 20 carbon atoms and $R^2$, $R^3$, $R^4$, $R^5$, $R^6$ and $R^9$ each independently is a hydrogen atom or a hydrocarbon group having 1 to 20 carbon atoms. Exemplary hydrocarbon groups include alkyl groups such as methyl, ethyl, propyl, butyl, amyl, hexyl, heptyl, octyl, nonyl, decyl, tetradecyl and octadecyl groups; cycloalkyl groups such as cyclohexyl group; aryl groups such as phenyl group; and aralkyl groups such as benzyl group. Of these electronegative groups, $OR^1$ and $OSiR^2R^3R^4$ are preferred. p and q each independently is zero or a number greater than zero, and the relationship of $p+q=m\alpha+2$ wherein m is the valence of M is satisfied. This relationship shows stoichiometry between the valence of M plus Mg and the substituents. The range of $0 \leq q/(\alpha+1) \leq 2$ designates that a number of X per total number of M and Mg is less than two. It is preferred to employ the range of $0 \leq q/(\alpha+1) < 1.5$, more preferably the range of $0 \leq q/(\alpha+1) \leq 1$.

It is necessary that the organomagnesium compounds employed in this invention are soluble in an inert hydrocarbon medium in order for the catalyst to achieve a high catalyst activity. Generally, organomagnesium compounds with $\alpha=0$ are insoluble in an inert hydrocarbon medium but specific organomagnesium compounds are soluble in an inert hydrocarbon medium. Such organomagnesium compounds can also be used in this invention with good results. Exemplary organomagnesium compounds with $\alpha=0$ include $(CH_3)Mg(n-C_3H_7)$, $(CH_3)Mg(i-C_3H_7)$, $(C_2H_5)Mg(i-C_3H_7)$, $(n-C_3H_7)Mg(i-C_3H_7)$, $Mg(i-C_3H_7)_2$, $(n-C_4H_9)Mg(i-C_3H_7)$, $(n-C_4H_9)Mg(sec-C_4H_9)$, $(C_2H_5)Mg(n-C_4H_9)$, $(C_2H_5)Mg(n-C_6H_{13})$, $(n-C_4H_9)Mg(n-C_8H_{17})$ and $Mg(C_2H_5)$ 0.5 $(n-C_4H_9)(sec-C_4H_9)0.5$.

The electron donative organic compound represented by D which can be employed in this invention is an electron donative organic compound having an oxygen atom, nitrogen atom, sulfur atom or phosphorus atom. Exemplary electron donative organic compounds include ethers such as diethyl ether, dibutyl ether, diisoamyl ether, ethylene glycol dimethyl ether, diethylene glycol dimethyl ether, glycerol trimethyl ether, vinylmethyl ether, tetrahydrofuran, dioxane, crown ether and propylene oxide; siloxanes such as hexamethyldisiloxane, symdihydrotetramethyldisiloxane, pentamethyltrihydrotrisiloxane, methylhydrocyclotetrasiloxane, methylhydropolysiloxane, dimethylpolysiloxane and phenylhydropolysiloxane; tertiary amines such as triethylamine, tributylamine, tetramethylethylenediamine, bis(diethylamino)methane and diazabicyclooctane; nitriles such as acetonitrile, propionitrile, acrylonitrile, benzylnitrile and benzonitrile; amides such as dimethylformamide and hexamethylphosphoramide; pyridines such as pyridine and methylpyridine; thioethers such as diethyl sulfide, ethylpropyl sulfide, dipropyl sulfide and ethylene sulfide; sulfoxides such as dimethyl sulfoxide, diethyl sulfoxide and dibutyl sulfoxide; phosphines such as triethylphosphine and triphenylphospine and esters of organic acids such as ethyl benzoate, ethyl p-toluate, ethyl thiophenecarboxylate and ethyl acetate. Of these compounds, ethers, siloxanes, amines and esters of organic acids are preferred.

The suffix r designates the amount of the electron donative organic compound coordinated with M or Mg and represents zero or a number greater than zero. A preferred range is $0 \leq r \leq 10$ and a more preferred range is $0 \leq r \leq 2$.

In order for the catalyst of this invention to show a high catalyst activity at high temperatures, it is preferred that q or r in the organomagnesium compound (a) is not zero.

The organomagnesium compounds (a) can be prepared by reacting a compound of RMgQ or R$_2$Mg or the mixture thereof wherein R is the same as defined above and Q is a halogen atom, with an organometallic compound of MR$_m$, MR$_a$X$_b$Q$_c$, MR$_m$D$_r$ or MR$_a$X$_b$Q$_c$D$_r$ wherein M, R, X, Q, D, m and r are the same as defined above and a+b+c=m, or an electron donative organic compound represented by D, in an inert hydrocarbon medium such as hexane, heptane, octane, cyclohexane, benzene and toluene at a temperature of about 0° C. to about 150° C, and, if necessary of if desired, further reacting reaction product with the electron donative organic compound or an alcohol, a siloxane, an amine, an imine, a thiol or a dithio compound. Exemplary methods of preparing the organomagnesium compound (a) which can be employed in this invention are described in U.S. Pat. Nos. 4,120,883 and 4,146,549 and Japanese Patent Application(OPI) No. 26893/1981.

The compounds (b) which can be employed include halides of boron, silicon, germanium, tin, phosphorus, antimony, bismuth or zinc and hydrogen chloride and any mixtures thereof. The halides are the compounds having at least one halogen atom. Preferred halides are the chlorides. Exemplary halides include boron halides such as boron trichloride, diethylboron chloride, dibutylboron chloride, diphenylboron chloride, ethylboron dichloride, butylboron dichloride, phenylboron dichloride, ethoxyboron dichloride and boron tribromide; silicon halides such as methylchlorosilane, methyldichlorosilane, tetrachlorosilane, trichlorosilane, methyltrichlorosilane, dimethylchlorosilane, dimethyldichlorosilane, trimethylchlorosilane, ethyldichlorosilane, ethyltrichlorosilane, diethylchlorosilane, diethyldichlorosilane, triethylchlorosilane, vinyltrichlorosilane, vinyldichlorosilane, propyltrichlorosilane, propyldichlorosilane, allyltrichlorosilane, butyltrichlorosilane, butyldichlorosilane, isobutyltrichlorosilane, sec-butyltrichlorosilane, tert-butyltrichlorosilane, sym-tetramethyldichlorosilane, octyldichlorosilane, decyltrichlorosilane, decyldichlorosilane, pentachlorodisilmethylene, hexachlorodisilmethylene, hexachlorocyclotrisilmethylene, phenyltrichlorosilane, phenyldichlorosilane, benzyltrichlorosilane, ethoxytrichlorosilane, diethoxydichlorosilane, butoxydichlorosilane, octoxytrichlorosilane and tetrabromosilane; germanium halides such as tetrachlorogermane, methyltrichlorogermane, dimethyldichlorogermane, trimethylchlorogermane, ethyltrichlorogermane, butyltrichlorogermane and ethoxytrichlorogermane; tin halides such as tin tetrachloride, methyltrichlorotin, diethyldichlorotin, dibutoxydibutyltin, trioctylchlorotin and tin tetrabromide; phosphorus halides such as phosphorus trichloride, phosphorus tribromide, phosphorus pentachloride, ethyldichlorophosphine and propyldichlorophosphine; antimony halides such as methyldichlorostibine, trimethylantimony dichloride and tripropylantimony dichloride; bismuth halides such as methyldichlorobismuthine, ethyldichlorobismuthine, butyldichlorobismuthine and dimethylchlorobismuthine; and zinc halides such as zinc chloride, ethylzinc chloride and butylzinc chloride. Of these compounds, chlorides of boron, tin, silicon or germanium are preferred in order to obtain polymers having a good particle size distribution and a high bulk density, and chlorides of silicon are more preferred.

The organometallic compounds (1) which can be employed include organometallic compounds or organo complex compounds of lithium, magnesium, aluminum or zinc. Exemplary organometallic compounds include organolithium compounds such as ethyllithium and butyllithium; organomagnesium compounds such as the same organomagnesium compounds represented by the formula M$_\alpha$MgR$_p$X$_q$.D$_r$ wherein M, R, X, D, $\alpha$, p, q and r are the same as defined above, as the organomagnesium compounds(a); organoaluminum compounds such as triethylaluminum, tributylaluminum, trioctylaluminum, diethylaluminum chloride, ethylaluminum sesquichloride, ethylaluminum dichloride, dibutylaluminum chloride, decylaluminum dichloride, diethylaluminum ethoxide, dibutylaluminum ethoxide, ethylethoxyaluminum chloride, trimethylsiloxyethylaluminum chloride, tetraisobutyldialuminoxane and aluminum isoprenyl; and organozinc compounds such as diethylzinc and dibutylzinc. Of these organometallic compounds, organoaluminum compounds are preferred to achieve the advantages of this invention. It is more preferred to employ alkylaluminum compounds having an electronegative group such as a halogen atom, e.g. chlorine atom, an alkoxy group or a siloxy group as the substituent.

The transition metal compounds (2) which can be employed in this invention include halides, alkoxyhalides, alkoxides, siloxyhalides, siloxides, aromatic ring complexes and chelate compounds of titanium such as titanium tetrachloride, titanium tetrabromide, titanium tetraiodide, ethoxytitanium trichloride, propoxytitanium trichloride, butoxytitanium trichloride, octoxytitanium trichloride, diethoxytitanium dichloride, dipropoxytitanium dichloride, dibutoxytitanium dichloride, triethoxytitanium monochloride, tripropoxytitanium monochloride, tributoxytitanium monochloride, phenoxytitanium trichloride, benzoyltitanium trichloride, dicyclopentadienyltitanium dichloride, tetraisopropoxytitanium, tetrapropoxytitanium, tetrabutoxytitanium, bis(triphenylsiloxy)titanium dichloride, titanium acetylacetonate and any mixtures thereof; halides, oxyhalides, alkoxyhalides and alkoxides of vanadium such as vanadium tetrachloride, vanadyl trichloride, ethoxyvanadyl dichloride, propoxyvanadyl dichloride, butoxyvanadyl dichloride, diethoxyvanadyl dichloride, dipropoxyvanadyl dichloride, dibutoxyvanadyl dichloride, tributoxyvanadyl and any mixtures thereof; halides, alkoxyhalides, alkoxides and chelate compounds of zirconium such as zirconium tetrachloride, zirconium tetrabromide, ethoxytrichlorozirconium, diethoxydichlorozirconium, dibutoxydichlorozirconium, ethoxytrichlorozirconium, butoxytrichlorozirconium, tetraethoxyzirconium, tetrabutoxyzirconium, zirconium acetylacetonate and any mixtures thereof; any mixtures of the titanium compounds and the vanadium compounds as described above; and any mixtures of the titanium compounds and the zirconium compounds as described above.

It is preferred to employ the titanium compound having at least one halogen atom or the vanadium compound having at least one halogen atom in order to show a high catalyst activity. For this purpose, it is more preferred to employ titanium tetrachloride, vanadyl trichloride or vanadium tetrachloride. In order to achieve a high catalyst activity at a temperature of at least about 150° C., the combination of a titanium compound with a vanadium compound is effective, and the mol ratio of the vanadium compound to the titanium compound which can be employed is typically about 50:1 to about 1:50. It is possible to obtain polymers having a broader molecular weight by using a combination of a titanium compound and a zirconium compound. For this purpose the mole ratio of the zirconium compound to the titanium compound is important and typically about 0.2-10:1, preferably about 0.6-4:1, and also it is preferred to employ a zirconium compound having at least three alkoxy groups.

Exemplary solid inorganic oxides(c) include silica, alumina, silica-alumina, magnesia, thoria, zirconia and any mixtures thereof. Of these solid inorganic oxides, silica and silica-alumina are preferred. It is preferred that the solid inorganic oxide has a BET surface area of at least about 20 m²/g, more preferably at least about 100 m²/g and a particle diameter of about 0.01-500μ, preferably about 0.1-100μ. When prior to use the solid inorganic oxide is dried at a temperature of about 200°-1200° C., preferably about 300°-900° C. in an inert gas atmosphere such as nitrogen gas or under reduced pressure, stable reproducibility of the catalyst activity of the catalyst according to this invention can be obtained. Use of the solid inorganic oxide not only makes the control of particle diameter of the polymers formed easy but also reduces the amounts of magnesium and a halogen atom as well as titanium, vanadium and zirconium remaining in the polymers formed.

As the electron donative organic compound(d), the same electron donative organic compound represented by D may be employed.

The reaction between the organomagnesium compound (a) and the compound(b) may be carried out by adding these two compounds into a reaction zone at the same time or by firstly charging one of them into the reaction zone and secondly adding the other into the reaction zone. The reaction temperature is not particularly limited and typically ranges from about −50° C. to about 150° C. A preferred reaction temperature ranges from about 0° C. to about 100° C. from the viewpoint of the progress of reaction. The mol ratio of the compound(b) to the organomagnesium compound(a) which can be employed is not particularly limited and typically ranges from about 0.1-100:1. A preferred mol ratio of the compound(b) to the organomagnesium compound(a) ranges from about 0.2-10:1. The mol of the organomagnesium compound(a) means a total mol of the metal M and the magnesium atom. For example, with $AlMg(C_2H_5)_3(n-C_4H_9)_2$ as the organomagnesium compound, its molecular weight is 252 g which corresponds to two mols. In order to obtain high molecular weight polymers at a high catalyst activity in the bulk polymerization at high temperatures and high pressures, it is preferred to carry out the reaction between the organomagnesium compound(a) and the compound(b) at a temperature of 100° C. to 150° C. at a mol ratio of the compound(b) to the organomagnesium compound(a) of 1.5-10:1. The solid reaction product(3) is formed by the reaction between the organomagnesium compound(a) and the compound(b) and it is preferred that the solid reaction product(3) thus formed is washed by decantation or filtration prior to the subsequent reaction between the organometallic compound(1) and the transition metal compound(2) in the presence of the solid reaction product(3) in order to control this reaction.

When the solid reaction product(3) is prepared by the reaction of the organomagnesium compound(a), the compound (b) and the solid inorganic oxide(c), the organomagnesium compound(a) and the compound(b) are reacted in the presence of the solid inorganic oxide(c) under the reaction conditions as described above. The mol ratio of the organomagnesium compound(a), the compound(b) and the solid inorganic oxide(c) which can be employed is not particularly limited, and is typically about 0.05-100 mmols, preferably about 0.1-50 mmols of the organomagnesium compound(a) per gram of the solid inorganic oxide(c). The same mol ratio of the compound(b) to the organomagnesium compound(a) as described above can be employed.

The mol ratio of the electron donative organic compound(d) to the magnesium atom in the solid reaction product(3) which can be employed is typically about 0.1-100:1, preferably about 0.1-20:1. The reaction between a reaction product of the organomagnesium compound(a) and the compound(b) or a reaction product of the organomagnesium compound(a), the compound(b) and the solid inorganic oxide (c), and an electron donative organic compound(d) may be carried out at a temperature of about 0° C. to about 100° C. at a concentration of at most one mol of the electron donative organic compound(d) per liter of the reaction medium.

Details will now be given of the preparation of the solid catalyst component[A] by the reaction of the organometallic compound(1) and the transition metal compound (2) in the presence of the solid reaction product(3).

This reaction can be carried out by (i) simultaneously adding the organometallic compound(1) and the transition metal compound(2) to a suspension of the solid reaction product(3) in an inert hydrocarbon reaction medium; (ii) firstly adding one of the organometallic compound(1) and the transition metal compound(2) to the suspension of the solid reaction product(3) and secondly adding the other compound to the resulting mixture suspension; or (iii) firstly adding one of the two transition metal compounds(2) to the suspension of the solid reaction product(3) in the case of a mixture of two transition metal compounds(2), secondly adding the organometallic compound(1) to the resulting mixture suspension and thirdly adding thereto the other transition metal compound(2). The reaction temperature and the reaction time are not particularly limited. The reaction temperature typically ranges from about −50° C. to about 150° C., preferably from about 0° C. to about 100° C. and the reaction time typically ranges from about one minute to about 24 hours. The ratio of the organometallic compound(1), the transition metal compound(2) and the solid reaction product(3) is important to achieve the advantages of this invention. When the transition compound(2) is a titanium compound, a vanadium compound or a mixture of a titanium compound and a vanadium compound, the mol ratio of the titanium compound and/or the vanadium compound to the magnesium atom in the solid reaction product which can be employed is typically about 0.005–5:1, preferably about 0.01–0.5:1. The amount of the organometallic compound(1) which can be employed depends upon that of the transition metal compound(2), and the mol ratio of the organometallic compound(1) to the titanium compound and/or the vanadium compound which can be employed is typically about 0.05–20:1, preferably about 0.4–10:1. In order to obtain polymers having a narrow molecular weight distribution at a high catalyst activity, the valence of the titanium atom and the vanadium atom in the solid catalyst component[A] is important. It is preferred that the valence of the titanium atom in the solid catalyst component [A] is mostly three and that of the vanadium atom is mostly three or four. On the other hand, when the transition compound(2) is a mixture of a titanium compound and a zirconium compound, the mol ratio of the titanium compound and the zirconium compound to the magnesium atom in the solid reaction product(3) which can be employed is typically about 0.001–0.35:1, preferably about 0.005–0.25:1 and more preferably about 0.01–0.1:1. In order to obtain polymers having a broader molecular weight distribution, the mol ratio of the titanium compound in the mixture of a titanium compound and a zirconium compound to the magnesium atom in the solid reaction product(3) is typically at most about 0.23:1, preferably about 0.0005–0.2:1 and the mol ratio of the zirconium compound to the titanium compound is preferably about 0.2–10:1, more preferably about 0.6–4:1. The amount of the organometallic compound(1) which can be employed depends upon that of the transition metal compound(2), and the mol ratio of the organometallic compound(1) to the titanium compound plus the zirconium compound is typically about 0.1–100:1, preferably about 0.5–50:1.

The solid catalyst component[A] as such after completion of the reaction may be supplied to the polymerization of olefins or the solid catalyst component[A] formed may be firstly separated by filtration or washed by decantation and secondly supplied to the polymerization of olefins.

The solid catalyst component[A] thus obtained is employed in combination with an organometallic component[B] as the catalyst for the polymerization of olefins.

Exemplary organometallic components[B] which can be used in this invention are organoaluminum compounds including trialkylaluminums such as $Al(C_2H_5)_3$, $Al(C_3H_7)_3$, $Al(C_4H_9)_3$, $Al(C_5H_{11})_3$, $Al(C_6H_{13})_3$, $Al(C_8H_{17})_3$ and $Al(C_{10}H_{21})_3$, alkylaluminum hydrides such as $Al(C_2H_5)_2H$ and $Al(i-C_4H_9)_2H$, alkylaluminum halides such as $Al(C_2H_5)_2Cl$, $Al(C_2H_5)Cl_2$, $Al(i-C_4H_9)_2Cl$ and $Al(C_2H_5)_2Br$, alkylaluminum alkoxides such as $Al(C_2H_5)_2(OC_2H_5)$ and $Al(i-C_4H_9)_2(OC_4H_9)$, alkylaluminum siloxides such as $Al(C_2H_5)_2(OSiH.CH_3.C_2H_5)$ and $Al(i-C_4H_9)-[OSi(CH_3)_2.i-C_4H_9]_2$, reaction products of a trialkylaluminum and a conjugated diene such as aluminum isoprenyl and aluminum myrcenyl; organozinc compounds such as dialkylzincs including $Zn(C_2H_5)_2$, $Zn(C_4H_9)_2$, $Zn(C_6H_{13})_2$, $Zn(C_8H_{17})_2$ and $Zn(C_2H_5)(n-C_3H_7)$, diarylzincs such as $Zn(C_6H_5)_2$ and alkylzinc alkoxides such as $Zn(C_3H_7)(OC_4H_9)$; the same organomagnesium compounds(a) as described above, and any mixtures thereof. Of these organometallic compounds, organoaluminum compounds are preferred, and trialkylaluminums and dialkylaluminum hydrides are more preferred.

The solid catalyst component[A] and the organometallic component[B] may be added under the polymerization conditions to a polymerization zone or may be combined prior to the polymerization of olefins.

The combination amount of the solid catalyst component[A] and the organometallic component[B] which can be employed depends upon the mol ratio of the transition metal in the solid catalyst component[A] to the organometallic component[B]. The mol ratio of the transition metal in the solid catalyst component[A] to the organometallic component[B] is typically about 3–1000:1, preferably about 5–500:1.

The catalyst of this invention which comprises a contact reaction product of the solid catalyst component[A] and the organometallic component[B] can produce polymers having a varied range of molecular weight distribution, i.e., a narrow molecular weight distribution to a broad molecular distribution but it is possible to produce polymers having a broader molecular weight distribution by employing a halogenated hydrocarbon[C].

Exemplary halogenated hydrocarbons include dichloromethane, chloroform, carbon tetrachloride, 1,2-dichloroethane, 1,1,2-trichloroethane, 1,1,2,2-tetrachloroethane, propyl chloride, 1,2-dichloropropane, 1,2,3-trichloropropane, butyl chloride, 1,2-dichlorobutane, 1,2,3,4-tetrachlorobutane, hexyl chloride, phenyl chloride, benzyl chloride, bromoform, 1,2-dichlorobutane and methyl iodide. Of these compounds, chlorinated hydrocarbons are stable and easily handled. It is preferred to employ halogenated hydrocarbons where the atomic ratio of the halogen atom to the carbon atom is at least one. The mol ratio of the halogenated hydrocarbon[C] to the organometallic component [B] which can be employed is typically about 0.01–100:1, preferably about 0.1–10:1.

According to the catalyst of this invention, polyethylenes having a low density can be produced by the copolymerization of ethylene with another olefin. Exemplary olefins other than ethylene include propylene, butene-1, pentene-1, hexene-1, heptene-1, octene-1, nonene-1, decene-1, dodecene-1, tetradecene-1 and 4-methylpentene-1. In order to obtain polyethylenes having a low density which possess a good particle size distribution in the suspension polymerization or in the gas phase polymerization, it is possible to conduct the copolymerization of ethylene with another olefin after a small amount of ethylene has been pre-polymerized.

Furthermore, polymers having a considerable amount of double bonds in their main chain or side chain can be produced by conducting the polymerization of olefins in the presence of a small amount of a conjugated diolefin such as butadiene, isoprene, 1,4-hexadiene, myrcene and ethylidene-2-norbornene or a non-conjugated diolefin such as 1,4-pentadiene, 1,5-hexadiene and vinylcyclohexene.

As for the polymerization method, there may be employed a conventional suspension polymerization or solution polymerization in the presence of a polymerization medium, a conventional gas phase polymerization in the absence of a polymerization medium and a bulk polymerization at high temperatures and high pressures. In the case of the suspension polymerization, the catalyst is introduced into a reactor together with a polymerization medium, e.g., an aliphatic hydrocarbon such as propane, butane, isobutane, pentane, isopentane, hexane or heptane; an aromatic hydrocarbon such as benzene or toluene; or an alicyclic hydrocarbon such as cyclohexane or methylcyclohexane, and an olefin is added under a pressure of about 1 to 50 Kg/cm$^2$ in an inert atmosphere and allowed to polymerize at a temperature of from room temperature to about 110° C. In order to obtain copolymers of ethylene with other olefins having a low density in the form of powder having a good particle size distribution, it is preferred to employ an aliphatic hydrocarbon having at most four carbon atoms such as propane, butane and isobutane as the polymerization medium. In the case of the solution polymerization, the catalyst is introduced into a reactor together with the same reaction medium as employed in the suspension polymerization and an olefin is added under a pressure of from about 1 to 400 Kg/cm$^2$, preferably from about 10 to 250 Kg/cm$^2$ in an inert atmosphere and allowed to polymerize at a temperature of from about 120° C. to about 350° C., preferably from about 150° C. to about 320° C. The gas phase polymerization can be conducted under an olefin pressure of about 1 to 50 Kg/cm$^2$ at a temperature of from room temperature to about 120° C. using a fluidized bed, a moving bed or mixing with a stirrer to provide better contact between the olefin and the catalyst.

There may be employed single stage polymerization having one polymerization zone or multistage polymerization having a plurality of polymerization zones. According to the polymerization process of this invention, polymers having a broad molecular weight distribution may be produced even in the single stage polymerization but it is also possible to produce polymers having a broad molecular weight distribution in the multistage polymerization. In order to control the molecular weight of polymers, the temperature of the reactor may be varied or it is also possible to add hydrogen or an organic compound which can easily cause chain transfer.

The bulk polymerization at high temperatures and high pressures according to this invention can be carried out at a pressure of about 400 Kg/cm$^2$ to about 3500 Kg/cm$^2$ at a temperature of about 120° C. to about 350° C., preferably at a pressure of about 500 Kg/cm$^2$ to about 2500 Kg/cm$^2$. The polymerization reaction mixture may form a single fluid phase or two separated phases and its average residence period of time in the polymerization system is typically about 2 to about 500 seconds, preferably about 10 to about 150 seconds.

The bulk polymerization at high temperatures and high pressures is typically carried out in the absence of an inert hydrocarbon medium as the polymerization medium. However, it is possible to employ a saturated hydrocarbon having 3 to 5 carbon atoms. As the polymerization apparatus, stirred autoclave reactors which are employed in the high pressure radical polymerization and tubular reactors as such or their modifications if necessary, may be employed in this invention. In order to control the polymerization reaction, to efficiently conduct its operation and to control the properties of polymers formed, it is possible to employ a system where a plurality of the autoclave reactors or the tubular reactors are connected in series or a system where at least one autoclave reactor is connected with at least one tubular reactor in series. These reactors may be jacket-cooled or a heat exchanger for removing polymerization heat may be provided between two polymerization reactors. Further it is possible to separately feed a monomer and a comonomer or part of them into each reactor and by this, the polymerization temperature or the copolymerization distribution of polymers may be controlled. Of the above described reaction systems, the system where at least one autoclave reactor is connected with at least one tubular reactor is particularly advantageous for increasing the conversion of monomers and obtaining high molecular weight polymers at high temperatures.

The following examples of preferred embodiments further illustrate the principle and practice of the invention.

In the following examples,

MI is the melt index measured according to ASTM D-1238, wherein the temperature and the load employed are 190° C. and 2.16 kg, respectively;

FR is the quotient of the melt high-load index measured at a temperature of 190° C. and a load of 21.6 Kg divided by MI; the larger the quotient, the broader is the molecular weight distribution;

Mesh is measured according to JIS Z8801-1966; and

The term "catalyst activity" shows the amount of a polymer formed in kilogram per gram of transition metal.

EXAMPLE 1

(I) Synthesis of Organomagnesium Compound(a)

In a 200 ml flask purged with nitrogen was charged 5 g of magnesium powder, and then 30 ml of n-octane containing 2 mmols of butoxyaluminum dichloride, and the temperature was raised to 100° C. Subsequently to the flask were added dropwise 70 ml of n-octane containing 100 mmols of n-butyl chloride and 100 mmols of ethyl bromide with stirring at 100° C. for 2 hours. After completion of the dropwise addition, the reaction mixture was stirred at 100° C. further for one hour. The solids formed were separated by filtration and the filtrate was subjected to analysis and found to have 0.85 ml/l of Mg and 0.017 mol/l of Al. Then 80 ml of this filtrate were accurately measured and charged in a 200 ml flask purged with nitrogen, and 35.4 mmols of n-butyl alcohol were added thereto at 0° C. with stirring and the reaction was continued at 30° C. further for one hour. As the result of analysis, the composition of the reaction solution obtained was found to have $Al_{0.02}Mg(C_2H_5)_{0.77}(n-C_4H_9)_{0.77}(On-C_4H_9)_{0.52}$ and the concentration of this compound was 0.86 mol per liter of the reaction solvent.

(II) Synthesis of Solid Catalyst Component[A]

The oxygen and moisture present inside a 250 ml flask equipped with a dropping funnel and a water-cooled reflux condenser were removed by replacement with nitrogen, and to the flask were charged 25 ml of a n-heptane solution containing trichlorosilane in an amount of one mol per liter of n-heptane and 25 ml of n-heptane in a nitrogen atmosphere, and the temperature was raised to 70° C. Then 25 ml of the organomagnesium compound(a) as obtained in (I) and 25 ml of n-heptane were accurately measured and charged in the dropping funnel, and then were added dropwise to the flask at 70° C. with stirring over 2 hours, resulting in a white suspension reaction solution. The suspension reaction solution was cooled to room temperature, left to stand, and the supernatant liquid was removed by decantation. The reaction product obtained was washed twice with 50 ml of n-heptane, and then n-heptane was added to the reaction product to adjust the amount of the liquid to 100 ml. To this suspension were added 1.4 mmols of titanium tetrachloride and 3.2 mmols of diethylaluminum chloride, and the reaction was carried out at 60° C. for two hours. After completion of the reaction, the reaction mixture solution was cooled, and n-heptane was added thereto to form 200 ml of a suspension.

(III) Polymerization-1

In a 1.5 l autoclave having been dehydrated and evacuated were charged the solid catalyst component[A] as prepared in (II) in an amount of 0.002 mmol per titanium atom and 0.25 mmol of triisobutylaluminum together with 800 ml of dehydrated and deaerated isopentane. After 150 mmols of butene-1 were introduced into the autoclave, the internal temperature of the actoclave was raised to 80° C. Then hydrogen was added up to 0.5 Kg/cm$^2$ and subsequently ethylene was added up to a total gauge pressure of 6 Kg/cm$^2$. The polymerization was carried out for one hour while the total gauge pressure of 6 Kg/cm$^2$ was maintained by supplying additional ethylene. As a result, there were obtained 61 g of powder, and the catalyst activity was 635 Kg/g.Ti. The polymer powder obtained showed a MI of 2.6, a FR of 24, a density of 0.932 and a bulk density of 0.40 g/cm$^3$, and more than 60% by weight of the polymer powder had a particle size of 105μ to 146μ.

Polymerization-2

In a 1.5 l autoclave having been dehydrated and evacuated were charged the solid catalyst component[A] as prepared in (II) in an amount of 0.002 mmol per titanium atom and 0.1 mmol of triethylaluminum together with 800 ml of dehydrated and deaerated cyclohexane. After 3 mmols of hydrogen and 900 mmols of octene-1 were charged in the autoclave, the internal temperature of the autoclave was raised to 180° C. and ethylene was added up to a total gauge pressure of 19 Kg/cm$^2$. The polymerization was carried out for 20 minutes while the total gauge of pressure of 19 Kg/cm$^2$ was maintained by supplying additional ethylene. As a result, there were obtained 40 g of a polymer, and the catalyst activity was 417 Kg/g.Ti. The polymer obtained showed a MI of 3.4 a FR of 23 and a density of 0.921.

Polymerization-3

Gas phase polymerization was conducted using a 50 l stainless steel autoclave of fluidized bed type. In the autoclave whose temperature had been adjusted to 80° C. were charged the solid catalyst component[A] as prepared in (II) in an amount of 0.07 mmol per titanium atom and 15 mmols of triethylaluminum, and the polymerization was conducted by introducing a mixed gas consisting of ethylene, butene-1 and hydrogen at a mol ratio of 1:0.25:0.02 into the autoclave at a rate of 15 cm/second for one hour at a gauge pressure of 10 Kg/cm$^2$. As a result, there was obtained 1300 g of a powder polymer having a bulk density of 0.38 g/cm$^3$. The catalyst activity was 387 Kg/g.Ti and the polymer showed a MI of 4.3, a FR of 26 and a density of 0.927.

EXAMPLES 2 TO 15

The oxygen and moisture present inside a 250 ml flask equipped with a dropping funnel and a water-cooled reflux condenser were removed by replacement with nitrogen, and to the flask were charged 30 ml of n-heptane containing methyldichlorosilane in an amount of one mol per liter of n-heptane and 20 ml of n-heptane in a nitrogen atmosphere, and the temperature was raised to 80° C. Then 50 ml of n-heptane containing 20 mmols of Al$_{0.1}$Mg(C$_2$H$_5$)$_{0.8}$(n—C$_8$H$_{17}$)$_{0.4}$(On—C$_4$H$_9$)$_{1.1}$ were accurately measured, charged in the dropping funnel and added dropwise to the flask at 80° C. with stirring over one hour, resulting in a white suspension reaction solution. The suspension reaction solution was cooled to room temperature and left to stand, and the supernatant liquid was removed by decantation. The reaction product obtained was washed three times with 50 ml of n-heptane, and then n-heptane was added to the reaction product to form 100 ml of a suspension. To the suspension was added the organometallic compounds (1) as set forth in Table 1, and the mixture was stirred at 60° C. for 30 minutes. Then to the reaction mixture solution was added the transition metal compound (2) as set forth in Table 1, and the reaction was carried out at 60° C. for four hours. The reaction mixture solution was left to stand, and the supernatant liquid was removed and then n-heptane was newly added to the reaction product to form a suspension which was employed as the solid catalyst component [A] in the polymerization.

The same copolymerization of ethylene and octene-1 as in Polymerization-2 of Example 1 was repeated except that the solid catalyst component [A] as obtained above in an amount of 0.002 mmol per titanium atom or titanium atom plus vanadium atom and 0.05 mmol of triethylaluminum were employed. The results are shown in Table 1.

TABLE 1

| Example No. | Organometallic Compound(1) | (mmol) | Transition Metal Compound(2) | (mmol) | Results of Polymerization |   |   |   |
|---|---|---|---|---|---|---|---|---|
|   |   |   |   |   | Catalyst Activity [Kg/g · T or (T × V)] | MI | FR | Density |
| 2 | Al(i-C$_4$H$_9$)Cl$_2$ | 4.84 | TiCl$_3$(On-C$_4$H$_9$) | 1.21 | 730 | 4.6 | 23 | 0.927 |
| 3 | Al(C$_2$H$_5$)$_2$Cl | 2.52 | TiCl$_4$ | 0.28 | 714 | 2.3 | 26 | 0.920 |
| 4 | Al(C$_2$H$_5$)$_2$Cl | 7.28 | TiCl$_4$ | 9.1 | 669 | 3.5 | 27 | 0.922 |
| 5 | Al(C$_2$H$_5$)$_3$ | 273 | TiCl$_2$(Oi-C$_3$H$_9$)$_2$ | 18.2 | 420 | 14.2 | 32 | 0.926 |
| 6 | Al(C$_2$H$_5$)$_2$(OC$_2$H$_5$) | 1.82 | TiCl$_{3.5}$(On-C$_4$H$_9$)$_{1.5}$ | 0.91 | 871 | 3.6 | 23 | 0.920 |
| 7 | Al(C$_2$H$_5$)$_2$Cl | 11.4 | TiCl$_4$ | 2.28 | 895 | 4.2 | 25 | 0.921 |
| 8 | Al(n-C$_4$H$_9$) (On-C$_6$H$_{13}$)Cl | 0.86 | TiCl$_4$ | 0.57 | 750 | 9.2 | 21 | 0.925 |
| 9 | Al(C$_8$H$_{17}$)$_2$(OSi.H.CH$_3$.C$_8$H$_{17}$) | 4.37 | TiCl$_4$ + VOCl$_3$ |   | 743 | 6.1 | 19 | 0.922 |

TABLE 1-continued

| Example No. | Organometallic Compound(1) (mmol) | | Transition Metal Compound(2) (mmol) | | Results of Polymerization | | | |
|---|---|---|---|---|---|---|---|---|
| | | | | | Catalyst Activity [Kg/g · T or (T × V)] | MI | FR | Density |
| | | | 0.91 | 2.73 | | | | |
| 10 | Al(C$_2$H$_5$)$_2$Cl | 5.6 | TiCl$_4$ | 0.56 | 780 | 1.2 | 22 | 0.924 |
| 11 | Al(C$_2$H$_5$)$_2$Cl | 0.03 | TiCl$_4$ | 0.09 | 526 | 5.5 | 33 | 0.926 |
| 12 | (i-C$_4$H$_9$)$_2$AlOAl(i-C$_4$H$_9$)$_2$ | 0.04 | TiCl$_4$ + VO(OC$_4$H$_9$)$_3$ 0.10 0.10 | | 600 | 8.9 | 30 | 0.922 |
| 13 | MgAl(C$_2$H$_5$)$_3$(n-C$_4$H$_9$)$_2$ | 0.007 | TiCl$_4$ | 0.12 | 392 | 11.5 | 32 | 0.929 |
| 14 | (n-C$_4$H$_9$)Li | 0.68 | TiCl$_4$ | 0.06 | 438 | 10.2 | 39 | 0.927 |
| 15 | Zn(C$_2$H$_5$)$_2$ | 3.70 | TiCl$_4$ | 12.2 | 305 | 12.5 | 42 | 0.929 |

EXAMPLES 16 TO 25

15 and 0.15 mmol of triethylaluminum were employed. The results are shown in Table 2.

TABLE 2

| | | Preparation of Solid Reaction Product(3) | | Results of Polymerization | | | | |
|---|---|---|---|---|---|---|---|---|
| Example No. | Organomagnesium Compound(a) (mmol) | Reaction Temperature (°C.) | Reaction Time (hour) | Catalyst Activity (Kg/g · Ti) | MI | FR | Density | Bulk Density (g/cm$^3$) |
| 16 | Mg(CH$_3$)(i-C$_3$H$_7$) 10 | 40 | 6 | 610 | 2.6 | 50 | 0.935 | 0.32 |
| 17 | Al$_{0.2}$Mg(C$_2$H$_5$)$_{0.4}$(n-C$_5$H$_{11}$)$_{1.0}$[OSi(CH$_3$)$_3$]$_{1.2}$ 35 | 50 | 3 | 1100 | 3.5 | 22 | 0.934 | 0.42 |
| 18 | Al$_{0.3}$Mg(n-C$_4$H$_9$)$_{1.0}$(n-C$_8$H$_{17}$)$_{1.6}$(On-C$_4$H$_9$)$_{0.3}$ 15 | 60 | 2 | 980 | 6.2 | 24 | 0.933 | 0.40 |
| 19 | Al$_{0.4}$Mg(n-C$_3$H$_7$)$_{0.8}$(n-C$_4$H$_9$)$_{1.5}$(On-C$_8$H$_{17}$)$_{0.9}$ 60 | " | " | 850 | 2.9 | 23 | 0.931 | 0.42 |
| 20 | Mg(n-C$_6$H$_{13}$)$_2$[O(n-C$_4$H$_9$)$_2$]$_{1.5}$ 90 | " | 4 | 620 | 4.1 | 30 | 0.936 | 0.35 |
| 21 | Al$_{0.7}$Mg(n-C$_5$H$_{11}$)$_{0.7}$(n-C$_{10}$H$_{21}$)$_{0.6}$(OCH$_2$C$_6$H$_5$)$_{2.8}$ 20 | −10 | " | 690 | 1.2 | 33 | 0.932 | 0.36 |
| 22 | ZnMg(C$_2$H$_5$)$_{1.8}$(n-C$_4$H$_9$)$_{1.8}$[S(n-C$_4$H$_9$)]$_{0.4}$ 2 | 30 | 2 | 310 | 0.6 | 40 | 0.933 | 0.34 |
| 23 | B$_{0.6}$Mg(n-C$_4$H$_9$)$_{3.1}$[N(C$_2$H$_5$)$_2$]$_{0.7}$ 130 | 30 | 2 | 630 | 3.5 | 27 | 0.936 | 0.35 |
| 24 | Al$_{0.01}$Mg(C$_2$H$_5$)$_{0.3}$(n-C$_4$H$_9$)$_{1.4}$(OCH$_2$CH$_2$O)$_{0.3}$ 40 | 65 | 1 | 820 | 2.2 | 26 | 0.931 | 0.40 |
| 25 | Zn$_2$Mg(C$_2$H$_5$)$_5$(C$_2$H$_5$)[N(CH$_2$CH$_2$)$_3$N]$_{4.0}$ 160 | 20 | 5 | 320 | 0.9 | 35 | 0.939 | 0.33 |

The oxygen and moisture present inside a 250 ml flask equipped with two dropping funnels and a water-cooled reflux condenser were removed by replacement with nitrogen, and to the flask were charged 40 ml of n-hexane in a nitrogen atmosphere. Then 30 ml of n-hexane containing the organometallic compound (a) as set forth in Table 2 and 30 ml of n-hexane containing 30 mmols of trichlorosilane were accurately measured and charged in the dropping funnels, respectively. After the internal temperature of the flask was adjusted to the temperature as set forth in Table 2, the both in the dropping funnels were simultaneously added dropwise to the flask with stirring over a period of time as set forth in Table 2. After completion of the reaction, the solids formed were washed with n-hexane by decantation, and n-hexane was added to the solids to form 200 ml of a suspension. To the suspension were added 7 mmols of titanium tetrachloride and 7 mmols of diethylaluminum ethoxide, and the reaction was carried out at 40° C. for three hours. Then the solids formed were separated from the reaction mixture solution by filtration, washed with n-hexane and dried to give a solid catalyst component[A].

The same copolymerization of ethylene and butene-1 as in Polymerization-1 of Example 1 was repeated except that the solid catalyst component[A] as obtained above in an amount of 0.002 mmol per titanium atom

EXAMPLES 26 TO 42

The oxygen and moisture present inside a 250 ml flask equipped with a dropping funnel and a water-cooled reflux condenser were removed by replacement with nitrogen, and to the flask was charged 50 ml of n-octane containing 20 mmols of Al$_{0.17}$Mg(C$_2$H$_5$)$_{0.51}$-(n—C$_4$H$_9$)$_{1.2}$(OSiH.CH$_3$.n—C$_4$H$_9$)$_{0.8}$ in a nitrogen atmosphere. Then 50 ml of n-octane containing the halide (b) as set forth in Table 3 were accurately measured and charged in the dropping funnel and added to the flask at the temperature over the period of time as set forth in Table 3. After completion of the reaction, the solids formed were washed three times with 50 ml of n-heptane by decantation, and then n-heptane was added to the solids to form 150 ml of a suspension. To the suspension were added 0.8 mmol of Al(C$_2$H$_5$)(On—C$_6$H$_{13}$)Cl, 0.3 mmol of TiCl$_4$ and 0.3 mmol of VOCl$_3$, and the reaction was carried out at 90° C. for one hour to give a suspension.

In a 1.5 l autoclave having been dehydrated and evacuated were charged the suspension as obtained above in an amount of 0.002 mmol per titanium atom plus vanadium atom and 0.15 mmol of triisobutylaluminum together with 800 ml of dehydrated and deaerated n-hexane. After 30 mmols of hydrogen and 700 mmols of 4-methylpentene-1 were charged in the autoclave, the internal temperature of the autoclave was raised to 150°

C. and ethylene was added up to a total gauge pressure of 15 Kg/cm² and the polymerization was carried out for 30 minutes while the gauge pressure was maintained by supplying additional ethylene to the autoclave. The results are shown in Table 3.

reaction mixture solution by filtration and dried to give a solid catalyst component[A].

The same gas phase copolymerization of ethylene and butene-1 as in Polymerization-3 of Example 1 was repeated except that the solid catalyst component[A] as obtained above in an amount of 0.1 mmol per titanium atom and 20 mmols of $Al(n-C_8H_{17})_{2.6}(OC_2H_5)_{0.4}$ were employed. The results are shown in Table 4.

TABLE 3

| | Preparation of Solid Reaction Product(3) | | | Results of Polymerization | | | |
|---|---|---|---|---|---|---|---|
| Example No. | Halide(b) | (mmol) | Reaction Temperature (°C.) | Reaction Time (hour) | Catalyst Activity [Kg/g · (Ti + V)] | MI | FR | Density |
| 26 | $BCl_3$ | 15 | 20 | 2 | 443 | 1.3 | 32 | 0.930 |
| 27 | $(n-C_4H_9)BCl_2$ | 30 | 50 | 3 | 490 | 9.2 | " | 0.933 |
| 28 | $(C_2H_5O)BCl_2$ | 60 | 70 | 0.5 | 526 | 6.4 | 33 | 0.929 |
| 29 | $HSiCl_3$ | 10 | 20 | 9 | 711 | 5.3 | 23 | 0.931 |
| 30 | $(CH_3)SiCl_3$ | 25 | 40 | 3 | 693 | 8.2 | 29 | " |
| 31 | $(CH_2=CH)SiCl_3$ | 15 | 60 | " | 748 | 2.6 | 25 | 0.929 |
| 32 | $(n-C_8H_{17})SiH.Cl_2$ | 13 | " | 6 | 700 | 6.5 | 27 | 0.927 |
| 33 | $(C_6H_5O)_2SiCl_2$ | 49 | 90 | 1 | 687 | 2.2 | 26 | 0.928 |
| 34 | $SiBr_4$ | 14 | −10 | 4 | 292 | 12.7 | 39 | 0.939 |
| 35 | $GeCl_4$ | 11 | 70 | 2 | 515 | 6.5 | 31 | 0.930 |
| 36 | $SnCl_4$ | 28 | 10 | 4 | 456 | 9.9 | 34 | 0.931 |
| 37 | $(CH_3)SbCl_2$ | 180 | 0 | 8 | 280 | 0.2 | 38 | 0.940 |
| 38 | $(C_2H_5)BiCl_2$ | 250 | 50 | 4 | 274 | 13.5 | 32 | 0.941 |
| 39 | $PCl_3$ | 10 | 140 | 3 | 259 | 9.8 | 36 | 0.940 |
| 40 | HCl | 154 | −5 | 2 | 292 | 0.1 | 32 | 0.939 |
| 41 | $SiCl_4$ | 40 | 70 | 2 | 651 | 0.3 | 24 | 0.929 |
| 42 | $(C_2H_5)_2SbCl_3$ | 54 | 110 | 4 | 297 | 21.2 | 39 | 0.942 |

EXAMPLES 43 TO 47

The oxygen and moisture present inside a 500 ml flask

TABLE 4

| | | | Results of Polymerization | | | | |
|---|---|---|---|---|---|---|---|
| Example No. | Solid Inorganic Oxide(c) | (g) | Catalyst Activity (Kg/g · Ti) | MI | FR | Density | Bulk Density (g/cm³) | Particle Size |
| 43 | Silica (Product of Fuji-Davison Chemical Ltd.; Grade 952) | 10 | 452 | 3.5 | 29 | 0.929 | 0.41 | More than 65% by weight of polymer powder had a particle size of 35 to 48 mesh. |
| 44 | Silica (Product of Fuji-Davison Chemical Ltd.; Grade 3A) | 20 | 379 | 2.9 | 27 | 0.927 | 0.42 | More than 60% by weight of polymer powder had a particle size of 20 to 28 mesh. |
| 45 | Silica by high Temperature method (Product of Cabot Corporation "CAB-O-SIL") | 5 | 365 | 6.4 | 26 | " | 0.39 | More than 75% by weight of polymer powder had a particle size of 145 to 200 mesh. |
| 46 | Silica-alumina (Product of Fuji-Davison Chemical Ltd.; Grade 135) | 4 | 398 | 0.37 | 33 | 0.931 | 0.41 | More than 80% by weight of polymer powder had a particle size of 48 to 100 mesh. |
| 47 | Magnesium oxide (Product of Kyowa Chemical Industry Co., Ltd.; "KYOWA Mag 150") | 2 | 324 | 0.21 | 42 | 0.927 | 0.35 | More than 50% by weight of polymer powder had a particle size of 148 to 200 mesh. | equipped with a dropping funnel and a water-cooled reflux condenser were removed by replacement with nitrogen, and to the flask were charged the solid inorganic oxide as set forth in Table 4 and 200 mmols of n-hexane containing 2 mmols of trichloroethoxysilane and the temperature was raised to 60° C. Then 100 ml of n-hexane containing 3 mmols of $Al_{0.01}Mg(n-C_6H_{13})_{2.03}\cdot[O(i-C_5H_{11})_2]_{0.5}$ were added dropwise from the dropping funnel to the flask at 60° C. over one hour. The solids were separated by filtration and suspended in 400 ml of n-hexane to form a suspension. Then to the suspension were added dropwise 1 mmol of $TiCl_3(On-C_4H_9)$ and 4 mmols of $Al(C_2H_5)_2[OSi(C_6H_5)_3]$ and the reaction was carried out at 30° C. for 3 hours. The solids formed were separated from the

EXAMPLES 48 TO 53

The oxygen and moisture present inside a 500 ml flask equipped with a dropping funnel and a water-cooled reflux condenser were removed by replacement with nitrogen, and to the flask were charged 50 ml of n-hexane containing 50 mmols of $Li_{0.08}Mg(C_2H_5)_{0.5}$-$(n-C_4H_9)_{0.58}(On-C_4H_9)_{1.0}$ in a nitrogen atmosphere and the temperature was raised to 40° C. Then 50 ml of n-hexane containing 20 mmols of trichlorosilane and 10 mmols of tetrachlorogermane were accurately measured and charged in the dropping funnel, and then were added dropwise to the flask at 40° C. with stirring over one hour. Then to the reaction solution were added 100 ml of n-hexane containing the electron donative organic compound (d) as set forth in Table 5, and the reaction was carried out for two hours by refluxing under heating. The reaction mixture solution was cooled to room temperature, washed with n-hexane by decantation and then n-hexane was added to the reaction product to form 200 ml of a suspension. To the suspension were added 10 mmols of titanium tetrachloride and 20 mmols of diethylaluminum chloride, and the reaction was carried out at 60° C. for four hours. Then n-hexane was added to the reaction mixture solution to form 350 ml of a suspension and the prepolymerization of ethylene was conducted by introducing ethylene into the suspension until the amount of polyethylene as set forth in Table 5 was obtained. Subsequently solids were separated from the suspension.

In a 1.5 l autoclave were charged the solids as obtained above in an amount of 0.002 mmol per titanium atom and 0.1 mmol of triisobutylaluminum together with 800 ml of dehydrated and deaerated isobutane, and then the α-olefin as set forth in Table 5 was charged in the autoclave. The internal temperature of the autoclave was raised to 80° C. and hydrogen was added up to 9.5 Kg/cm$^2$ and then ethylene was added up to a gauge pressure of 11.5 Kg/cm$^2$. The polymerization was carried out for one hour while the gauge pressure was maintained by supplying additional ethylene to the autoclave. The results are shown in Table 5.

and added otherwise to the flask at 20° C. with stirring over one hour. After the temperature was raised to 60° C., the reaction was continued further for three hours. The solids formed were separated from the reaction mixture solution by filtration, washed with n-hexane and dried. The solids thus obtained contained 28% by weight of titanium.

The same copolymerization of ethylene and octene-1 as in Polymerization-2 of Example 1 was repeated except that 40 mg of the solid catalyst component as obtained above and 0.8 mmol of triisobutylaluminum were employed. As a result, 104 g of a polymer were obtained and the catalyst activity was 9.3 Kg/g.Ti. The polymer showed a MI of 17.5, a FR of 42 and a density of 0.935.

EXAMPLES 55 TO 59

In a 1.5 l autoclave having been dehydrated and evacuated were charged the same solid catalyst component [A] as prepared in Example 1 in an amount of 0.003 mmol per titanium atom and the organometallic component [B] as set forth in Table 6 together with 800 ml of dehydrated and deaerated n-octane. Then 2 mmols of hydrogen were added to the autoclave and the internal temperature of the autoclave was raised to 230° C. and ethylene was added up to a total gauge pressure of 36 Kg/cm$^2$. The polymerization of ethylene was carried

TABLE 5

| Example No. | Electron Donative Organic Compound(d) (mmol) | Ethylene Pre-polymerization (g) | α-Olefin (mmol) | Results of Polymerization | | | | Bulk Density (g/cm$^3$) |
|---|---|---|---|---|---|---|---|---|
| | | | | Catalyst Activity (Kg/g · Ti) | MI | FR | Density | |
| 48 | Ethyl benzoate 25 | 2 | — | 830 | 0.4 | 25 | 0.968 | 0.43 |
| 49 | Ethyl benzoate 100 | 9 | Hexene-1 200 | 613 | 6.7 | 23 | 0.922 | 0.38 |
| 50 | Ethyl p-toluate 60 | 20 | Octene-1 180 | 597 | 4.2 | 21 | 0.925 | 0.39 |
| 51 | Diisoamyl ether 300 | 4 | 3-Methyl-butene-1 50 | 411 | 0.9 | 29 | 0.944 | 0.41 |
| 52 | Diisoamyl ether 250 | 14 | Decene-1 100 | 490 | 2.3 | 26 | 0.939 | 0.40 |
| 53 | Hexamethylphosphoramide 10 | 6 | Propylene 30 | 370 | 1.9 | 39 | 0.947 | 0.41 |

EXAMPLE 54

In a 1 l autoclave having been dehydrated and evacuated were charged the same solid catalyst component[A] as prepared in Example 1 in an amount of 0.001 mmol per titanium atom and 0.03 mmol of trioctylaluminum together with 0.5 l of dehydrated and deaerated n-hexane. After 5 mmols of hydrogen was added to the autoclave, ethylene was added up to a gauge pressure of 50 Kg/cm$^2$ and the internal temperature of the autoclave was raised to 270° C. and the polymerization of ethylene was carried out for 6 minutes. As a result, there were obtained 42 g of a polymer having a MI of 0.9 and a FR of 31.

COMPARATIVE EXAMPLE 1

The oxygen and moisture present inside a 250 ml flask equipped with a dropping funnel and a water-cooled reflux condenser were removed by replacement with nitrogen, and to the flask were charged 100 ml of n-hexane containing titanium tetrachloride in an amount of 0.5 mol per liter of n-hexane in a nitrogen atmosphere. Then 114 mmols of diethylaluminum chloride were accurately measured, charged in the dropping funnel out for 20 minutes while the total gauge pressure of 36 Kg/cm$^2$ was maintained by supplying additional ethylene to the autoclave. The results are shown in Table 6.

TABLE 6

| Example No. | Organometallic Component [B] (mmol) | Results of Polymerization | | |
|---|---|---|---|---|
| | | Catalyst Activity (Kg/g · Ti) | MI | FR |
| 55 | Al(n-C$_{10}$H$_{21}$)$_3$ 0.06 | 387 | 2.3 | 22 |
| 56 | Al(C$_2$H$_5$)$_2$Cl 0.09 | 359 | 1.9 | 26 |
| 57 | AlMg(C$_2$H$_5$)$_3$(n-C$_4$H$_9$)$_3$ 1.8 | 216 | 7.2 | 29 |
| 58 | Al(C$_2$H$_5$)$_{2.6}$(On-C$_4$H$_9$)$_{0.4}$ 0.25 | 288 | 8.9 | 30 |
| 59 | Al(n-C$_8$H$_{17}$)$_{2.8}$Cl$_{0.2}$ 0.03 | 407 | 0.9 | 29 |

EXAMPLE 60

(I) Synthesis of Organomagnesium Compound (a)

In a 200 ml flask purged with nitrogen were charged 5 g of magnesium powder, and then 30 ml of n-octane containing 2 mmols of butoxyaluminum dichloride were added thereto, and the temperature was raised to 100° C. Subsequently to the flask were added dropwise 100 mmols of n-butyl chloride and 70 ml of n-octane containing 100 mmols of ethyl bromide with stirring at 100° C. for 2 hours. After completion of the dropwise addition, the reaction mixture was stirred further for one hour. The solids formed were separated by filtration and the filtrate was subjected to analysis. As a result, the composition of the filtrate was found to have $Al_{0.02}Mg(C_2H_5)_{1.02}(n-C_4H_9)_{1.02}(On-C_4H_9)_{0.02}$ and the concentration of this compound was 0.87 mol per liter of the reaction solvent.

(II) Synthesis of Solid Catalyst Component[A]

The oxygen and moisture present inside a 250 ml flask equipped with a dropping funnel and a water-cooled reflux condenser were removed by replacement with nitrogen, and to the flask were charged 25 ml of n-heptane containing trichlorosilane in an amount of one mol per liter of n-heptane and 25 ml of n-heptane in a nitrogen atmosphere, and the temperature was raised to 70° C. Then 25 ml of the organomagnesium compound(a) as obtained above and 25 ml of n-heptane were accurately measured and charged in the dropping funnel, and then were added dropwise to the flask at 70° C. with stirring over 2 hours, resulting in a white suspension reaction solution. The suspension reaction solution was cooled to room temperature and left to stand, and the supernatant liquid was removed by decantation. The reaction product obtained was washed twice with 50 ml of n-heptane, and then n-heptane was added to the reaction product to adjust the amount of the liquid to 100 ml. To this suspension were added 0.53 mmol of tetrabutoxytitanium, 1.06 mmols of tetrabutoxyzirconium and 10.5 mmols of ethylaluminum dichloride, and the reaction was carried out at 60° C. for two hours. After completion of the reaction, the solids formed were separated from the reaction mixture solution by filtration, washed with n-heptane and dried. The solid catalyst component[A] thus obtained contained 1.1% by weight of titanium and 4.2% by weight of zirconium.

(III) Polymerization-1

In a 1.5 l autoclave having been dehydrated and evacuated were charged 20 mg of the solid catalyst component[A] as prepared in (II) and 0.25 mmol of triisobutylaluminum together with 800 ml of dehydrated and deaerated n-hexane, and then the internal temperature of the autoclave was raised to 80° C. The hydrogen was added up to 9.6 Kg/cm² and subsequently ethylene was added up to a total gauge pressure of 20 Kg/cm². The polymerization was carried out for one hour while the total gauge pressure of 20 Kg/cm² was maintained by supplying additional ethylene to the autoclave. As a result, there were obtained 109 g of polymer powder, and the catalyst activity was 103 Kg/g.(Ti+Zr). The polymer powder obtained showed a MI of 0.21, a FR of 83 and a bulk density of 0.37 g/cm³, and more than 65% by weight of the polymer powder had a particle size of 105μ to 149μ.

Polymerization-2

In a 1.5 l autoclave having been dehydrated and evacuated were charged 20 mg of the solid catalyst component[A] as prepared in (II) and 0.1 mmol of triethylaluminum together with 800 ml of dehydrated and deaerated cyclohexane. After 25 mmols of hydrogen and 800 mmols of octene-1 were charged in the autoclave, the internal temperature of the autoclave was raised to 160° C. and ethylene was added up to a total gauge pressure of 33 Kg/cm². The polymerization was carried out for 20 minutes while the total gauge pressure of 33 Kg/cm² was maintained by supplying additional ethylene to the autoclave. As a result, there were obtained 40 g of a polymer, and the catalyst activity of 235 Kg/g.(Ti+Zr). The polymer obtained showed a MI of 0.89, a FR of 58 and a density of 0.927.

Polymerization-3

Gas phase polymerization was conducted using a 50 l stainless steel autoclave of fluidized bed type. In the autoclave whose temperature had been adjusted to 80° C. were charged 100 mg of the solid catalyst component [A] as prepared in (II) and 20 mmols of triethylaluminum, and the polymerization was conducted by introducing a mixed gas consisting of ethylene and hydrogen at a mol ratio of 1:0.20 into the autoclave at a rate of 15 cm/second for one hour at a gauge pressure of 20 Kg/cm². As a result, there were obtained 1100 g of polymer powder having a bulk density of 0.37 g/cm³. The catalyst activity was 207 Kg/g.(Ti+Zr) and the polymer powder showed a MI of 0.32 and a FR of 71.

EXAMPLES 61 TO 69

The oxygen and moisture present inside a 250 ml flask equipped with a dropping funnel and a water-cooled reflux condenser were removed by replacement with nitrogen, and to the flask were charged 50 ml of n-heptane containing 30 mmols of trichlorosilane in a nitrogen atmosphere, and the temperature was raised to 60° C. Then 50 ml of n-heptane containing 25 mmols of $Al_{0.1}Mg(C_2H_5)_{1.7}(n-C_8H_{17})_{0.5}(On-C_4H_9)_{0.1}$ were accurately measured, charged in the dropping funnel and added dropwise to the flask at 60° C. with stirring over one hour, resulting in a white suspension reaction solution. The suspension reaction solution was cooled to room temperature and left to stand, and the supernatant liquid was removed by decantation. The reaction product obtained was washed three times with 50 ml of n-heptane, and then n-heptane was added to the reaction product to form 100 ml of a suspension. To the suspension were added the organometallic compounds (1) and the transition metal compounds (2) as set forth in Table 7 and the reaction was carried out at 60° C. for four hours. The reaction mixture solution was left to stand, and the supernatant liquid was removed and then n-heptane was newly added to the reaction product to form a suspension which was employed as the solid catalyst component [A] in the polymerization.

The same polymerization of ethylene as in Polymerization-2 of Example 60 was repeated except that the solid catalyst component [A] as obtained above in an amount of 0.02 mmol per titanium atom plus vanadium atom, the organometallic component [B] and the halogenated hydrocarbon [C] as set forth in Table 8 were employed. The results are shown in Table 8.

TABLE 7

| | | Transition Metal Compound(2) | | | | |
|---|---|---|---|---|---|---|
| Example No. | Organometallic Compound(1) (mmol) | Titanium Compound(i) (mmol) | Zirconium Compound(ii) (mmol) | Order of Addition | | |
| | | | | 1 | 2 | 3 |
| 61 | Al(C₂H₅)Cl₂ 1.20 | Ti(On-C₄H₉)₄ 0.265 | Zr(On-C₄H₉)₄ 0.530 | (2)-(ii) | (2)-(i) | (1) |

TABLE 7-continued

| Example No. | Organometallic Compound(1) (mmol) | Transition Metal Compound(2) | | Order of Addition | | |
| --- | --- | --- | --- | --- | --- | --- |
| | | Titanium Compound(i) (mmol) | Zirconium Compound(ii) (mmol) | 1 | 2 | 3 |
| 62 | Al(C$_2$H$_5$)Cl$_2$ 36.3 | Ti(On-C$_4$H$_9$)$_4$ 0.910 | Zr(On-C$_4$H$_9$)$_4$ 3.63 | (2)-(i) | (2)-(ii) | (1) |
| 63 | Al(i-C$_4$H$_9$)Cl$_2$ 7.72 | Ti(Oi-C$_3$H$_7$)$_4$ 0.241 | Zr(On-C$_4$H$_9$)$_4$ 1.68 | (2)-(i) | (2)-(ii) | (1) |
| 64 | Al(C$_2$H$_5$)$_{1.5}$Cl$_{1.5}$ 16.0 | Ti(On-C$_4$H$_9$)$_4$ 1.14 | Zr(On-C$_4$H$_9$)$_4$ 1.14 | (1) | (2)-(ii) | (2)-(i) |
| 65 | Al(C$_2$H$_5$)Cl$_2$ 42.2 | Ti(On-C$_4$H$_9$)$_3$Cl 4.69 | Zr(Oi-C$_3$H$_7$)$_4$ 2.35 | (2)-(i) | (1) | (2)-(ii) |
| 66 | Al(C$_2$H$_5$)Cl$_2$ 42.1 | Ti(On-C$_4$H$_9$)$_4$ 1.75 | Zr(On-C$_4$H$_9$)$_4$ 5.28 | (2)-(ii) | (2)-(i) | (1) |
| 67 | Al(C$_2$H$_5$)Cl$_2$ 42.1 | Ti(On-C$_4$H$_9$)$_4$ 1.75 | Zr(On-C$_4$H$_9$)$_4$ 5.28 | " | | |
| 68 | Al(C$_2$H$_5$)Cl$_2$ 42.1 | Ti(On-C$_4$H$_9$)$_4$ 1.75 | Zr(On-C$_4$H$_9$)$_4$ 5.28 | " | | |
| 69 | Al(C$_2$H$_5$)Cl$_2$ 42.1 | Ti(On-C$_4$H$_9$)$_4$ 1.75 | Zr(On-C$_4$H$_9$)$_4$ 5.28 | " | | |

TABLE 8

| Example No. | Organometallic Component[B] (mmol) | Halogenated Hydrocarbon[C] (mmol) | Results of Polymerization | | | |
| --- | --- | --- | --- | --- | --- | --- |
| | | | Catalyst Activity [Kg/g · (Ti + Zr)] | MI | FR | Bulk Density (g/cm$^3$) |
| 61 | Al(i-C$_4$H$_9$)$_3$ 0.2 | — | 232 | 0.25 | 73 | 0.37 |
| 62 | Al(i-C$_4$H$_9$)$_3$ 0.4 | CH$_2$Cl$_2$ 0.4 | 87 | 0.08 | 115 | 0.36 |
| 63 | Al isoprenyl 0.8 | — | 89 | 0.36 | 65 | 0.35 |
| 64 | Al(n-C$_8$H$_{17}$)$_3$ 0.6 | — | 275 | 0.75 | 72 | 0.36 |
| 65 | Al(C$_2$H$_5$)$_{2.5}$Cl$_{0.5}$ 2.0 | — | 19 | 0.32 | 45 | 0.21 |
| 66 | Al(C$_2$H$_5$)$_3$ 0.4 | — | 264 | 0.69 | 71 | 0.37 |
| 67 | Al(i-C$_4$H$_9$)$_3$ 0.4 | ClCH$_2$(CHCl)$_2$CH$_2$Cl 0.1 | 189 | 0.31 | 96 | " |
| 68 | Al(i-C$_4$H$_9$)$_3$ 0.6 | ClCH$_2$CH$_2$Cl 0.3 | 166 | 0.27 | 89 | " |
| 69 | (i-C$_4$H$_9$)$_2$Al$_2$O 0.2 | — | 198 | 0.44 | 68 | 0.38 |

EXAMPLE 70

The oxygen and moisture present inside a 250 ml flask equipped with two dropping funnels and a water-cooled reflux condenser were removed by replacement with nitrogen, and to the flask was charged 40 ml of n-hexane in a nitrogen atmosphere. Then 30 ml of n-hexane containing 35 mmols of Al$_{0.2}$Mg(C$_2$H$_5$)$_{0.4}$(n—C$_4$H$_{11}$)$_{1.0}$[OSi(CH$_3$)$_3$]$_{1.2}$ and 30 ml of n-hexane containing 30 mmols of methyldichlorosilane were accurately measured and charged in the dropping funnels, respectively. After the internal temperature of the flask was raised to 60° C., the both in the dropping funnels were simultaneously added dropwise to the flask with stirring to carry out the reaction for two hours. After completion of the reaction, the solid formed were washed with n-hexane by decantation, and n-hexane was added to the solids to form 200 ml of a suspension. To the suspension were added 1.22 mmols of tetrabutoxyzirconium and 11.6 mmols of ethylaluminum dichloride, and the reaction was carried out at 65° C. for three hours. Then to the reaction mixture solution was added 0.24 mmol of titanium tetrachloride and the reaction was continued at 65° C. further for one hour. The solids formed were separated from the reaction mixture solution by filtration, washed with n-hexane and dried to give a solid catalyst component[A].

The same polymerization of ethylene as in Polymerization-1 of Example 60 was repeated except that the solid catalyst component[A] as obtained above in an amount of 0.02 mmol per titanium atom plus zirconium atom and 0.5 mmol of trioctylaluminum were employed. As a result, the catalyst activity was 102 Kg/g.(Ti+Zr) and the polymer obtained showed a MI of 0.12, a FR of 68 and a bulk density of 0.37.

EXAMPLE 71

The reaction between 15 mmols of Al$_{0.3}$Mg-(n—C$_4$H$_9$)$_{1.0}$(n—C$_8$H$_{17}$)$_{1.6}$(On—C$_4$H$_9$)$_{0.6}$ and 30 mmols of tetrachlorosilane was carried out under the same reaction conditions as in Example 70. Then to the suspension obtained were added 0.1 mmol of titanium tetrachloride and 0.1 mmol of ethylaluminum dichloride and the reaction was carried out at 50° C. for one hour. Then to the reaction mixture solution was added 0.3 mmol of tetrabutoxyzirconium and 3 mmols of ethylaluminum dichloride and the reaction was continued at 50° C. further for two hours. The solids formed was separated from the reaction mixture solution by filtration and dried to give a solid catalyst component[A].

The same polymerization of ethylene as in Polymerization-1 of Example 60 was repeated except that the solid catalyst component[A] as obtained above in an amount of 0.02 mmol per titanium atom plus zirconium atom and 0.5 mmol of trioctylaluminum were employed. As a result, the catalyst activity was 175 Kg/g.(Ti+Zr) and the polymer obtained showed a MI of 0.36, a FR of 66 and a bulk density of 0.37 g/cm$^3$.

EXAMPLE 72

The same procedures for the preparation of the solid catalyst component[A] as in Example 70 were repeated except that 90 mmols of $Mg(n-C_6H_{13})_2[O(n-C_4H_9)_2]_{1.5}$, 50 mmols of tin tetrachloride, 11.3 mmols of titanium tetrachloride, 11.3 mmols of zirconium tetrachloride dissolved in dibutyl ether and 30 mmols of triisobutylaluminum were employed.

The polymerization of ethylene alone was conducted under the same polymerization conditions as in Polymerization-2 of Example 60 except that the solid catalyst component[A] as obtained above in an amount of 0.01 mmol per titanium atom plus zirconium atom, 0.8 mmol of triethylaluminum and 50 mmols of hydrogen were employed. As a result, the catalyst activity was 86 Kg/g.(Ti+Zr) and the polymer obtained showed a MI of 0.12 and a FR of 59.

EXAMPLE 73

The same procedure for the preparation of the solid catalyst component[A] as in Example 70 was repeated except that 20 mmols of $B_{0.6}Mg(n-C_4H_9)_{3.1}[N(C_2H_5)_2]_{0.7}$, 80 mmols of germanium tetrachloride, 2.25 mmols of titanium tetrachloride, 1.5 mmols of zirconium tetrachloride dissolved in n-butanol and 11.3 mmols of trioctylaluminum were employed.

The same copolymerization of ethylene and octene-1 as Polymerization-2 of Example 60 was repeated except that the solid catalyst component[A] as obtained above in an amount of 0.02 mmol per titanium atom plus zirconium atom was employed. As a result, the catalyst activity was 79 Kg/g.(Ti+Zr) and the polymer obtained showed a MI of 0.43, a FR of 56 and a density of 0.931.

EXAMPLE 74

The same procedure for the preparation of the solid catalyst component[A] as in Example 70 was repeated except that 30 mmols of $Li_{0.05}Mg(C_2H_5)_{1.05}(n-C_3H_7)_{1.0}$, 40 mmols of boron trichloride, 0.42 mmol of tetrabutoxytitanium, 2.52 mmols of zirconium tetrachloride dissolved in dibutyl ether and 29.4 mmols of ethylaluminum sesquichloride were employed.

The same polymerization of ethylene as in Polymerization-1 of Example 60 was repeated except that the solid catalyst component[A] as obtained above in an amount of 0.02 mol per titanium atom plus zirconium atom was employed. As a result, the catalyst activity was 89 Kg/g.(Ti+Zr) and the polymer obtained showed a MI of 0.32, a FR of 76 and a bulk density of 0.32 g/cm$^3$.

EXAMPLE 75

The reaction between 30 mmols of $Al_{0.02}Mg(C_2H_5)_{1.0}(n-C_4H_9)_{1.0}(OCH_2CH_2O)_{0.03}$ and 35 mmols of trichlorosilane was carried out under the same reaction conditions as in Example 70. Then to the suspension thus obtained were added 1.32 mmols of tetrabutoxyzirconium and 13.5 mmols of ethylaluminum dichloride and the reaction was carried out at 65° C. for two hours. After the supernatant liquid was removed from the reaction mixture solution by decantation, n-hexane was added thereto in the same amount as that of the supernatant liquid removed. Then to the mixture solution were added 0.44 mmol of titanium tetrachloride and 0.45 mmol of diethylaluminum ethoxide and the reaction was carried out at 40° C. for one hour. The solids formed were separated from the reaction mixture solution by filtration and dried to give a solid catalyst component[A].

The same polymerization of ethylene as in Polymerization-1 of Example 60 was repeated except that the solid reaction catalyst component[A] as obtained above in an amount of 0.02 mmol per titanium atom plus zirconium atom was employed. As a result, the catalyst activity was 186 Kg/g.(Ti+Zr) and the polymer obtained showed a MI of 0.22, a FR of 85 and a bulk density of 0.39 g/cm$^3$.

EXAMPLES 76 to 78

The oxygen and moisture present inside a 500 ml flask equipped with a dropping funnel and a water-cooled reflux condenser were removed by replacement with nitrogen, and to the flask were charged the solid inorganic oxide as set forth in Table 9 and 200 mmols of n-decane containing 2 mmols of trichlorovinylsilane and the temperature was raised to 60° C. Then 100 ml of n-decane containing 3 mmols of $Al_{0.01}Mg(C_6H_{13})_{2.03}[O(i-C_5H_{11})_2]_{0.5}$ were added dropwise from the dropping funnel to the flask at 60° C. over one hour. The solids were separated by filtration and suspended in 200 ml of n-decane to form a suspension. Then to the suspension were added dropwise 0.05 mmol of tetrabutoxytitanium, 0.15 mmol of tetrabutoxyzirconium and 1.0 mmol of ethylaluminum dichloride and the reaction was carried out at 150° C. for 3 hours. The solids formed were separated from the reaction mixture solution by filtration and dried to give a solid catalyst component[A].

The same gas phase polymerization of ethylene as in Polymerization-3 of Example 60 was repeated except that the solid catalyst component[A] as obtained above in an amount of 0.1 mmol per titanium atom plus zirconium atom and 20 mmols of trioctylaluminum were employed. The results are shown in Table 9.

TABLE 9

| Example No. | Solid Inorganic Oxide(c)* (g) | Catalyst Activity 8 Kg/g · (Ti + Zr)] | MI | FR | Bulk Density (g/cm$^3$) | Particle Size |
|---|---|---|---|---|---|---|
| 76 | Silica (Product of Fuji-Davison Chemical Ltd.; Grade 952) | 7 | 165 | 0.45 | 65 | 0.37 | More than 75% by weight of polymer powder had a particle size of 35 to 48 mesh. |
| 77 | Gamma-alumina (Product of Sumitomo | 15 | 110 | 0.01 | 82 | 0.38 | More than 70% by weight of polymer powder had a |

TABLE 9-continued

| Example No. | Solid Inorganic Oxide(c)* (g) | Catalyst Activity 8 Kg/g · (Ti + Zr)] | Results of Polymerization | | | Particle Size |
|---|---|---|---|---|---|---|
| | | | MI | FR | Bulk Density (g/cm³) | |
| 78 | Chemical Co., Ltd.; Grade A-11 Magnesium oxide (Product of Kyowa Chemical Co., Ltd.; "KYOWA MAG 150") | 5 | 109 | 0.12 | 71 | 0.36 | particle size of 100 to 200 mesh. More than 50% by weight of polymer powder had a particle size of 145 to 200 mesh. |

*Solid inorganic oxide was dried at 700° C. for 5 hours in a nitrogen atmosphere prior to use.

EXAMPLE 79

The oxygen and moisture present inside a 500 ml flask equipped with a dropping funnel and a water-cooled reflux condenser were removed by replacement with nitrogen, and to the flask were charged 50 ml of n-hexane containing 40 mmols of $Al_{0.15}Mg(C_2H_5)_{1.0}(n-C_4H_9)_{1.0}(n-C_{10}H_{21})_{0.45}$ in a nitrogen atmosphere and the temperature was raised to 40° C. Then 50 ml of n-hexane containing 60 mmols of trichlorosilane were accurately measured and charged in the dropping funnel and added dropwise to the flask at 40° C. with stirring over one hour. Then to the reaction solution were added 100 ml of n-hexane containing 3 mmols of ethyl benzoate, and the reaction was carried out for two hours by refluxing under heating. The reaction mixture solution was cooled to room temperature, washed with n-hexane by decantation and then n-hexane was added to the reaction product to form 200 ml of a suspension. To the suspension were added 1.60 mmols of tetrabutoxyzirconium and 6.5 mmols of dibutylaluminum dichloride, and the reaction was carried out at 60° C. for four hours. Then 0.5 mmol of titanium tetrachloride was added to the reaction mixture solution and the reaction was carried out at 60° C. for two hours. Then n-hexane was added to the reaction mixture solution to form 350 ml of a suspension and the pre-polymerization of 0.7 mol of ethylene was conducted by introducing ethylene containing 5 mol % of hydrogen into the suspension. Subsequently solids were separated from the suspension.

In a 50 l stainless steel autoclave of fluidized bed were charged the solids as obtained above in an amount of 0.1 mmol per titanium atom plus zirconium atom and 10 mmols of triethylaluminum, and the same polymerization as in Polymerization-3 of Example 60 was repeated except that a mixed gas consisting of ethylene, butene-1 and hydrogen at a mol ratio of 1:0.3:0.1 was employed. As a result, there was obtained polymer powder having a bulk density of 0.35 g/cm³ and the catalyst activity was 186 Kg/g.(Ti+Zr). The polymer powder showed a MI of 3.5, a FR of 62 and a density of 0.9222.

EXAMPLE 80

The oxygen and moisture present inside a 250 ml flask equipped with a dropping funnel and a water-cooled reflux condenser were removed by replacement with nitrogen, and to the flask were charged 25 ml of n-octane containing trichlorosilane in an amount of one mol per liter of n-octane and 25 ml of n-octane in a nitrogen atmosphere, and the temperature was raised to 70° C. Then 25 ml of n-octane containing 10 mmols of $Al_{0.15}Mg(C_2H_5)_{0.25}(n-C_4H_9)_{1.58}(On-C_4H_9)_{0.62}$ were accurately measured, charged in the dropping funnel and added dropwise to the flask at 110° C. with stirring over two hours, resulting in a white suspension reaction solution. The suspension reaction solution was cooled to room temperature and left to stand, and the supernatant liquid was removed by decantation. The reaction product obtained was washed twice with 50 ml of n-octane, and then n-octane was added to the reaction product to adjust the amount of liquid to 100 ml. To the suspension thus obtained were added 0.5 mmol of an equimolar mixture of $TiCl_4$ and $VOCl_3$ and 1.0 mmol of diethylaluminum chloride, and the reaction was carried out at 60° C. for two hours. The solids formed were separated from the reaction mixture solution by filtration to give a solid catalyst component[A].

Polymerization was carried out using a 2 l autoclave equipped with a stirrer. In the autoclave were introduced an ethylene-butene-1 mixture containing 60% by weight of butene-1 at a rate of about 40 Kg/hour, the above described solid catalyst component[A] at a rate of 0.10 g/hour and triethylaluminum at a rate of 2.0 mmols/hour at a polymerization pressure of 1400 Kg/cm² at a polymerization temperature of 250° C. As a result, the amount of a polymer obtained was 3.5 Kg/hour, and the catalyst activity was 38 Kg/g.solid catalyst component[A] and 2380 Kg/g.(Ti+V). The polymer showed a MI of 0.42 and a density of 0.918.

EXAMPLES 81 to 89

Various solid catalysts[A] were prepared in the similar manner as in Example 80 under the reaction conditions set forth in Table 10.

In Example 81 polymerization was carried out using a tubular reactor having an inner diameter of 5 mm and a length of 40 m at a polymerization pressure of 1200 Kg/cm² at a polymerization temperature of 260° C. In Examples 82 to 89 polymerization was carried out using a 2 l stirred autoclave reactor connected, in series, with a tubular reactor having an inner diameter of 5 mm and a length of 40 m at a polymerization pressure of 1300 Kg/cm² at a polymerization temperature of 260° C. In each of Examples 81 to 89 the solid catalyst component[A] was introduced into the reactor at a rate of 0.10 g/hour and the organometallic component[B] as set forth in Table 10 was introduced into the reactor at the rate as set forth in Table 10.

The results are shown in Table 10.

TABLE 10

| Example | Organomagnesium Compound (a) | Halide (b) | Reaction Conditions (a) + (b) | |
|---|---|---|---|---|
| | | | Reaction Temperature | Reaction Time |

TABLE 10-continued

| No. | (mmol) | | (mmol) | (°C.) | (hour) |
|---|---|---|---|---|---|
| 81 | $Al_{0.3}Mg(n-C_4H_9)_{1.3}(n-C_3H_7)_{1.0}(On-C_8H_{17})_{0.6}$ | 10 | $SiHCl_3$ 20 | 110 | 2 |
| 82 | $Al_{0.7}Mg(n-C_5H_{11})_{1.7}(n-C_{10}H_{21})_{1.6}(OCH_2C_6H_5)_{0.8}$ | 10 | $CH_3SiHCl_2$ 30 | 120 | " |
| 83 | $Mg(CH_3)(i-C_3H_7)$ | 10 | $GeCl_4$ 50 | 130 | 4 |
| 84 | $B_{0.5}Mg(n-C_4H_9)_{3.1}[N(C_2H_5)_2]_{0.7}$ | 10 | $SnCl_4$ 40 | 120 | 5 |
| 85 | $ZnMg(C_2H_5)_{1.8}(n-C_4H_9)_{1.8}(S-n-C_4H_9)_{0.4}$ | 10 | $C_2H_5BCl_2$ 50 | " | 4 |
| 86 | $Be_{0.5}Mg(C_2H_5)(C_4H_9)_2[N(CH_2CH_2)_3]_{1.5}$ | 10 | $SbCl_3$ 30 | 110 | 5 |
| 87 | $Mg(n-C_6H_{13})_2[(n-C_4H_9)_2]_{1.2}$ | 10 | $SiHCl_3$ 20 | " | 2 |
| 88 | $Al_{0.2}Mg(C_2H_5)_{0.4}(n-C_5H_{11})_{1.0}[OSi(CH_3)_3]_{1.2}$ | 10 | $SiHCl_3$ 20 | 120 | " |
| 89 | $LiMg(sec-C_4H_9)(n-C_4H_9)_2$ | 10 | $SiHCl_3$ 20 | " | " |

| Example No. | Organometallic Compound (1) (mmol) | | Transition Metal Compound (2)*1 (mmol) | | Reaction Conditions [(a) + (b)] + (1) + (2) | |
|---|---|---|---|---|---|---|
| | | | | | Reaction Temperature (°C.) | Reaction Time (hour) |
| 81 | $Al(C_2H_5)_2Cl$ | 1.5 | $Ti(On-C_4H_9)_4 + VOCl_3$ 1:2 | 0.40 | 60 | 2 |
| 82 | $Al(C_2H_5)_2(OC_2H_5)$ | 2.0 | $TiCl_4 + VO(On-C_4H_9)_3$ 1:1 | 0.32 | " | " |
| 83 | $Al(C_2H_5)Cl_2$ | 3.5 | $Ti(On-C_4H_9)_4 + Zr(On-C_4H_9)_4$ 1:1 | 0.50 | 70 | " |
| 84 | $Al(C_4H_9)_2(OSiH.CH_3C_4H_9)$ | 3.0 | $TiCl_4$ | 0.50 | " | 3 |
| 85 | $(i-C_4H_9)_2AlOAl(i-C_4H_9)_2$ | 2.5 | $TiCl_2(Oi-C_3H_7) + VOCl_3$ 1:2 | 0.35 | 60 | 2 |
| 86 | $Zn(C_2H_5)_2$ | 1.0 | $TiCl_4 + VOCl_3$ 3:1 | 0.20 | 10 | 1 |
| 87 | $Li(n-C_4H_9)$ | 0.8 | $TiCl_4 + VOCl_3$ 1:1 | 0.40 | 0 | 2 |
| 88 | $AlMg(C_2H_5)_{1.5}(n-C_4H_9)_2(OC_2H_5)_{1.5}$ | 1.0 | $TiCl_2(On-C_4H_9)_2 + VOCl(On-C_4H_9)_2$ 1:3 | 0.45 | 5 | 1 |
| 89 | $Al(n-C_8H_{17})_3$ | 0.5 | $TiCl_4 + VOCl_2(On-C_4H_9)$ 1:1 | 0.5 | 10 | 2 |

| Example No. | Organometallic Component [B] (mmol/hour) | | Comonomer | | Catalyst Activity | | MI | Density |
|---|---|---|---|---|---|---|---|---|
| | | | Kind | Amount in Feed Monomer (Weight %) | [Kg/g · A*¹] | [Kg/g · Ti or (Ti + V)] | | |
| 81 | $Al(C_2H_5)_3$ | 3.0 | butene-1 | 60 | 35 | 1950 | 0.27 | 0.921 |
| 82 | $Al(C_2H_5)_2H$ | 2.5 | " | 60 | 58 | 4460 | 0.16 | 0.918 |
| 83 | $Al(n-C_8H_{17})_3$ | 4.0 | " | 70 | 38 | 1810 | 0.97 | 0.906 |
| 84 | $Al(C_2H_5)_{2.7}C_{0.3}$ | 3.0 | " | 60 | 29 | 2090 | 0.78 | 0.919 |
| 85 | $Al(i-C_4H_9)_3$ | 2.5 | " | 40 | 42 | 3500 | 0.43 | 0.938 |
| 86 | $Al(C_2H_5)_{2.6}(OC_2H_5)_{0.4}$ | 3.0 | hexene-1 | 55 | 36 | 3270 | 0.12 | 0.928 |
| 87 | $Al(C_2H_5)_{2.7}(OSiH.CH_3C_2H_5)_{0.3}$ | 3.0 | " | 75 | 42 | 2630 | 1.22 | 0.915 |
| 88 | Al isoprenyl | 0.8 | octene-1 | 60 | 62 | 4770 | 0.28 | 0.925 |
| 89 | $Al(C_2H_5)_3$ | 1.0 | " | 80 | 51 | 2830 | 1.75 | 0.918 |

*¹mol ratio in case of a mixture of two compounds employed
*¹:A:solid catalyst component [A]

EXAMPLE 90

In a 250 ml flask equipped with a dropping funnel and a water-cooled reflux condenser were charged 5 g of silica (a product of Fuji-Davison Chemical Ltd.; Grade 952) having been dried at 250° C. for two hours as the solid inorganic oxide(c) and 100 ml of n-octane containing 10 mmols. of hydrotrichlorosilane as the halide(b), and the reaction was carried out at 60° C. for two hours. Then to the flask were added 50 ml of n-octane containing 5 mmols of $Al_{0.01}$ $Mg(n—C_4H_9)_{1.2}(OSiH.CH_3$-$n—C_4H_9)_{0.8}$ as the organomagnesium compound(a) at 110° C. over one hour, and the reaction was further carried out at 110° for one hour. To the reaction mixture solution thus obtained were added 2.5 mmols of an equimolar mixture of $TiCl_4$ and $VOCl_3$ and 5.0 mmols of diethylaluminum chloride at 60° C. and the reaction was carried out at 60° C. for two hours. The solids formed were separated from the reaction mixture solution by filtration to give a solid catalyst component[A]. The amount of chlorine and that of (Ti+V) in the solid catalyst component[A] were 16.5 % by weight and 1.5% by weight, respectively.

The same copolymerization of ethylene and butene-1 of Example 82 was repeated except that the solid catalyst component[A] as obtained above and triethylaluminum were introduced into the polymerization system at rates of 0.10 g/hour and 2.5 mmols/hour, respectively. As a result, the catalyst activity was 29 Kg/g.solid catalyst component[A] and 1933 Kg/g.(Ti+V). The polymer showed a MI of 0.28 and a density of 0.921.

EXAMPLE 91

In a 250 ml flask equipped with a dropping funnel and a water-cooled reflux condenser were charged 50 ml of n-octane containing 10 mmols of $Al_{0.17}Mg$-$(n—C_4H_9)_{2.26}(OSiH.CH_3.n—C_4H_9)_{0.25}$ as the organomagnesium compound(a). Then 50 ml of n-octane containing 25 mmols of $SiHCl_3$ were added dropwise to the flask at 120° C. with stirring over two hours, resulting in a white suspension reaction solution. The suspension reaction solution was cooled to 60° C., and 50 ml of n-octane containing 1 mmol of ethyl benzoate were added thereto, and the reaction was carried out at 60° C. for two hours. After the supernatant liquid of the reaction mixture solution was removed by decantation, n-octane was added to the reaction product to adjust the amount of liquid to 150 ml. To the suspension thus obtained were added 0.5 mmol of an equimolar mixture of TiCl₄ and VOCl₃ and 1.0 mmol of diethylaluminum chloride while the temperature of the flask was maintained at 70° C., and the reaction was carried out at 70° C. for two hours. The solids formed were separated from the reaction mixture solution by filtration to give a solid catalyst component[A].

The same copolymerization of ethylene and butene-1 of Example 82 was repeated except that the solid catalyst component[A] as obtained above was introduced into the polymerization system at a rate of 0.10 g/hour. As a result, the catalyst efficiency was 49 Kg/g.solid catalyst component [A] and 3850 Kg/g.(Ti+V). The polymer showed a MI of 0.25 and a density of 0.908.

EXAMPLE 92

The same reaction among the organomagnesium compound(a), the halide(b) and the solid inorganic oxide(c) of Example 90 was repeated except that 5 g of silica (a product of Fuji-Davison Chemical Ltd.; Grade 951) were employed as the solid inorganic oxide(c). To the reaction mixture solution thus obtained were added 50 ml of n-octane containing 2 mmols of ethyl p-toluate, and the reaction was carried out at 60° C. for two hours. After the supernatant liquid of the reaction product containing solids was removed by decantation, n-octane was added to the reaction product to adjust the amount of liquid to 150 ml. To the suspension thus obtained were added the equimolar mixture of TiCl₄ and VOCl₃ and the diethylaluminum chloride under the same conditions as in Example 91, and the reaction was carried out under the same conditions as in Example 91. The solids formed was separated from the reaction mixture solution by filtration to give a solid catalyst component[A]. The amount of chlorine and that of (Ti+V) in the solid catalyst component [A] were 14.5% by weight and 1.4% by weight, respectively.

The same copolymerization of ethylene and butene-1 of Example 82 was repeated except that the solid catalyst component[A] as obtained above and triethylaluminum were introduced into the polymerization system at rates of 0.10 g/hour and 2.5 mmols/hour, respectively. As a result, the catalyst activity was 25 Kg/g.solid catalyst component[A] and 1785 Kg/g.(Ti+V). The polymer showed a MI of 0.33 and a density of 0.910.

While the invention has been described in detail and with reference to specific embodiments thereof, it will be apparent to one skilled in the art that various changes and modifications can be made therein without departing from the spirit and scope thereof.

What is claimed is:

1. A catalyst useful for polymerizing olefins which comprises a solid catalyst component [A] and an organometallic component [B], the solid catalyst component [A] being obtained by reacting (1) an organometallic compound with (2) a transition metal compound selected from the group consisting of a titanium compound, a vanadium compound, a mixture of a titanium compound and a vanadium compound and a mixture of a titanium compound and a zirconium compound, in the presence of (3) a solid reaction product of (a) an organomagnesium compound of the formula

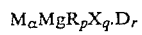

wherein
α, p, q and r each independently is 0 or a number greater than 0,
p+q=mα+2
0≦q/(α+1)<2
m is the valence of M,
M is a metal of the 1st to 3rd groups of the Periodic Table,
R is at least one hydrocarbon group having 1 to 20 carbon atoms,
X is at least one member selected from the group consisting of a hydrogen atom and electronegative groups containing an oxygen atom, a nitrogen atom or a sulfur atom,
D is an electron donative organic compound,
with (b) at least one compound selected from the group consisting of halides of boron, silicon, germanium, tin, phosphorus, antimony, bismuth or zinc and hydrogen chloride.

2. The catalyst of claim 1, wherein the solid reaction product (3) is a reaction product of the organomagnesium compound (a), the compound (b) and a solid inorganic oxide (c).

3. The catalyst of claim 1, wherein the solid reaction product (3) is a reaction product of the organomagnesium compound (a) and the compound (b) with an electron donative organic compound (d).

4. The catalyst of claim 2, wherein the solid reaction product (3) is a reaction product of the organomagnesium compound (a), the compound (b) and the solid inorganic oxide (c) with an electron donative organic compound (d).

5. The catalyst of claim 1, wherein the organometallic compound (1) is reacted with the transition metal compound in the presence of the solid reaction product (3) having been separated from the reaction solution.

6. The catalyst of claim 1, wherein M in the organomagnesium compound (a) of the solid reaction product (3) is lithium, beryllium, boron, aluminum or zinc metal.

7. The catalyst of claim 6, wherein M in the organomagnesium compound (a) of the solid reaction product (3) is aluminum metal.

8. The catalyst of claim 1, wherein α in the organomagnesium compound (a) of the solid reaction product (3) is $0 \leq \alpha \leq 1$.

9. The catalyst of claim 8, wherein α in the organomagnesium compound (a) of the solid reaction product (3) is $0.01 \leq \alpha \leq 0.5$.

10. The catalyst of claim 1, wherein X in the organomagnesium compound (a) of the solid reaction (3) is $OR^1$, $OSiR^2R^3R^4$, $NR^5R^6$, $SR^7$ or

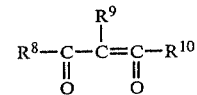

wherein $R^1$, $R^7$, $R^8$ and $R^{10}$ each independently is a hydrocarbon group having 1 to 20 carbon atoms and $R^2$, $R^3$, $R^4$, $R^5$, $R^6$ and $R^9$ each independently is a hydrogen atom or a hydrocarbon group having 1 to 20 carbon atoms.

11. The catalyst of claim 10, wherein X in the organomagnesium compound (a) of the solid reaction product (3) is $OR^1$ wherein $R^1$ is a hydrocarbon atom having 1 to 20 carbon atoms.

12. The catalyst of claim 10, wherein X in the organomagnesium compound (a) of the solid reaction product (3) is $OSiR^2R^3R^4$ wherein $R^2$, $R^3$ and $R^4$ each is a hydrogen atom or a hydrocarbon group having 1 to 20 carbon atoms.

13. The catalyst of claim 1, wherein D is an ether, a siloxane, an amine or an ester of an organic acid.

14. The catalyst of claim 1, wherein q in the organomagnesium compound (a) of the solid reaction product (3) is $0 \leq q/(\alpha+1) \leq 1.5$.

15. The catalyst of claim 1, wherein r in the organomagnesium compound (a) of the solid reaction product (3) is $0 \leq r \leq 10$.

16. The catalyst of claim 15, wherein r in the organomagnesium compound (a) of the solid reaction product (3) is $0 \leq r \leq 2$.

17. The catalyst of claim 1, wherein the compound (b) of the solid reaction product (3) is a boron halide.

18. The catalyst of claim 1, wherein the compound (b) of the solid reaction product (3) is a tin halide.

19. The catalyst of claim 1, wherein the compound (b) of the solid reaction product (3) is a silicon halide.

20. The catalyst of claim 1, wherein the compound (b) of the solid reaction product (3) is a germanium halide.

21. The catalyst of claim 1, wherein the organometallic compound (1) is an organolithium compound, an organomagnesium compound, an organoaluminum compound or an organozic compound.

22. The catalyst of claim 21, wherein the organometallic compound (1) is an organoaluminum compound.

23. The catalyst of claim 22, wherein the organometallic compound (1) is an alkylaluminum containing a halogen atom or an electronegative group.

24. The catalyst of claim 1, wherein the transition metal compound (2) is a titanium compound having at least one halogen atom.

25. The catalyst of claim 1, wherein the transition metal compound (2) is a vanadium compound having at least one halogen atom.

26. The catalyst of claim 1, wherein the transition metal compound (2) is a mixture of a titanium compound having at least one halogen atom and a vanadium compound having at least one halogen atom.

27. The catalyst of claim 26, wherein the atomic ratio of vanadium to titanium is about 0.02-50:1.

28. The catalyst of claim 1, wherein the transition metal compound (2) is a mixture of a titanium compound having at least three alkoxy groups and a zirconium compound having at least three alkoxy groups.

29. The catalyst of claim 28, wherein the atomic ratio of zirconium to titanium is about 0.2-10:1.

30. The catalyst of claim 24, wherein the mol ratio of the titanium compound to the magnesium atom in the solid reaction product (3) is about 0.005-5:1.

31. The catalyst of claim 25, wherein the mol ratio of the vanadium compound to the magnesium atom in the solid reaction product (3) is about 0.005-5:1.

32. The catalyst of claim 26, wherein the mol ratio of the titanium compound plus the vanadium compound to the magnesium atom in the solid reaction product (3) is about 0.005-1:1.

33. The catalyst of claim 28, wherein the mol ratio of the titanium compound plus the zirconium compound to the magnesium atom in the solid reaction product (3) is about 0.001-0.35:1.

34. The catalyst of claim 24, wherein the mol ratio of the organometallic compound (1) to the titanium compound is about 0.05-20:1.

35. The catalyst of claim 25, wherein the mol ratio of the organometallic compound (1) to the vanadium compound is about 0.05-20:1.

36. The catalyst of claim 26, wherein the mol ratio of the organometallic compound (1) to the titanium compound plus the vanadium compound is about 0.05-20:1.

37. The catalyst of claim 28, wherein the mol ratio of the organometallic compound (1) to the titanium compound plus the zirconium compound is about 0.1-100:1.

38. The catalyst of claim 1, wherein the reaction between the organomagnesium compound (a) and the compound (b) is conducted at a temperature of about $-50°$ C. to about 150° C.

39. The catalyst of claim 1, wherein the mol ratio of the compound (b) to the organomagnesium compound (a) is about 0.01-100:1.

40. The catalyst of claim 2, wherein the solid inorganic oxide (c) is at least one compound selected from the group consisting of silica, alumina, silica-alumina, magnesia, thoria and zirconia.

41. The catalyst of claim 38, wherein the amount of the organomagnesium compound (a) is about 0.05 mmol to about 100 mmols per gram of the solid inorganic oxide (c).

42. The catalyst of claim 3, wherein the electron donative organic compound (d) is an ether, a siloxane, an amine or an ester of an organic acid.

43. The catalyst of claim 42, wherein the mol ratio of the electron donative organic compound (d) to the magnesium atom in the solid reaction product (3) is about 0.01-100:1.

44. The catalyst of claim 1, wherein the organometallic component [B] is at least one compound selected from the group consisting of an organoaluminum compound, an organozinc compound and an organomagnesium compound.

45. The catalyst of claim 44, wherein the organometallic compound [B] is an organoaluminum compound.

46. The catalyst of claim 45, wherein the organoaluminum compound is a trialkylaluminum, an alkylaluminum hydride, an alkylaluminum halide, an alkylaluminum alkoxide, an alkyl-aluminum siloxide and a reaction product of an alkylaluminum and a conjugated diene.

47. The catalyst of claim 46, wherein organoaluminum compound is a trialkylaluminum.

48. The catalyst of claim 46, wherein the organoaluminum compound is an alkylaluminum hydride.

49. The catalyst of claim 1, wherein the mol ratio of the organometallic component [B] to the transition metal in the solid catalyst component [A] is about 3-1000:1.

50. The catalyst of claim 1, which comprises the catalyst component [A], the organometallic component [B] and a halogenated hydrocarbon [C].

51. The catalyst of claim 50, wherein the mol ratio of the halogenated hydrocarbon [C] to the organometallic component [B] is about 0.01-100:1.

* * * * *

UNITED STATES PATENT AND TRADEMARK OFFICE
CERTIFICATE OF CORRECTION

PATENT NO.  : 4,471,066

DATED       : September 11, 1984

INVENTOR(S) : Hisaya Sakurai, et al

It is certified that error appears in the above-identified patent and that said Letters Patent is hereby corrected as shown below:

| | |
|---|---|
| Col. 5, line 46 | After "necessary" delete "of" and substitute --or-- |
| Col. 19, Table 5, | Delete "(mm0l)" and substitute --(mmol)-- |
| Col. 20, line 1 | Delete "otherwise" and substitute --dropwise-- |
| Col. 25, Heading, Col. 3, 3rd line | Delete "8 Kg/" and substitute --[Kg/-- |
| Col. 29, Table 10, Example No. 87, Column 2 | After "Mg(n-$C_6H_{13}$)$_2$[" insert --O-- |

Signed and Sealed this

Ninth Day of April 1985

[SEAL]

Attest:

DONALD J. QUIGG

Attesting Officer        Acting Commissioner of Patents and Trademarks